United States Patent
Lee et al.

(10) Patent No.: US 9,185,658 B2
(45) Date of Patent: Nov. 10, 2015

(54) UPLINK POWER CONTROL METHOD AND USER EQUIPMENT

(75) Inventors: Moonil Lee, Anyang-si (KR); Jaehoon Chung, Anyang-si (KR); Hyunsoo Ko, Anyang-si (KR); Seunghee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 13/698,896

(22) PCT Filed: May 19, 2011

(86) PCT No.: PCT/KR2011/003696
§ 371 (c)(1),
(2), (4) Date: Jan. 29, 2013

(87) PCT Pub. No.: WO2011/145890
PCT Pub. Date: Nov. 24, 2011

(65) Prior Publication Data
US 2013/0128833 A1    May 23, 2013

Related U.S. Application Data

(60) Provisional application No. 61/346,474, filed on May 20, 2010.

(51) Int. Cl.
*H04W 52/14* (2009.01)
*H04W 52/42* (2009.01)
*H04W 52/54* (2009.01)

(52) U.S. Cl.
CPC ............ *H04W 52/146* (2013.01); *H04W 52/42* (2013.01); *H04W 52/545* (2013.01)

(58) Field of Classification Search
CPC ............ H04W 52/146; H04W 52/325; H04W 52/367; H04W 52/08; H04W 52/22; H04W 52/34; H04W 52/545; H04B 7/024; H04B 7/0404; H04B 7/0619
See application file for complete search history.

(56) References Cited

U.S. PATENT DOCUMENTS

| 2010/0113004 A1* | 5/2010 | Cave et al. ............... 455/422.1 |
| 2010/0142455 A1* | 6/2010 | Imamura ..................... 370/329 |
| 2010/0172430 A1* | 7/2010 | Melzer et al. ............... 375/267 |

FOREIGN PATENT DOCUMENTS

| KR | 10-2003-0049031 | 6/2003 |
| KR | 10-2009-0063085 | 6/2009 |
| KR | 10-2010-0006144 | 1/2010 |

\* cited by examiner

*Primary Examiner* — David Oveissi
(74) *Attorney, Agent, or Firm* — Dentons US LLP

(57) ABSTRACT

The present invention relates to an uplink power control method and user equipment, which involve determining a power correction factor by considering the number of antenna ports. According to the present invention, even when a base station transmits the same power control information to the user equipment, the user equipment maps the power control information to another power correction factor and determines an uplink transmission power depending on an uplink transmission condition. Thus, uplink power control can be performed in a more efficient manner.

6 Claims, 11 Drawing Sheets

FIG. 11

| Codebook index | Number of layers v | |
|---|---|---|
| | 1 | 2 |
| 0 | $\frac{1}{\sqrt{2}}\begin{bmatrix}1\\1\end{bmatrix}$ (TPC type 1) | $\frac{1}{\sqrt{2}}\begin{bmatrix}1 & 0\\0 & 1\end{bmatrix}$ (TPC type 1) |
| 1 | $\frac{1}{\sqrt{2}}\begin{bmatrix}1\\-1\end{bmatrix}$ (TPC type 1) | |
| 2 | $\frac{1}{\sqrt{2}}\begin{bmatrix}1\\j\end{bmatrix}$ (TPC type 1) | |
| 3 | $\frac{1}{\sqrt{2}}\begin{bmatrix}1\\-j\end{bmatrix}$ (TPC type 1) | |
| 4 | $\frac{1}{\sqrt{2}}\begin{bmatrix}1\\0\end{bmatrix}$ (TPC type 2) | |
| 5 | $\frac{1}{\sqrt{2}}\begin{bmatrix}0\\1\end{bmatrix}$ (TPC type 2) | |

FIG. 12

| | Codebook for 4Tx rank-1 | | | | | | | |
|---|---|---|---|---|---|---|---|---|
| Index 0 to 7 (TPC type 1) | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| Index 8 to 15 (TPC type 1) | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |
| Index 16 to 23 (TPC type 2) | $\frac{1}{2}\begin{bmatrix}1\\0\\1\\0\end{bmatrix}$ | $\frac{1}{2}\begin{bmatrix}1\\0\\1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

UPLINK POWER CONTROL METHOD AND USER EQUIPMENT

This Application is a 35 U.S.C. §371 National Stage Entry of International Application No. PCT/KR2011/003696, filed May 19, 2011 and claims the benefit of U.S. Provisional Application No. 61/346,474, filed May 20, 2010, all of which are incorporated by reference in their entirety herein.

FIELD OF THE INVENTION

The present invention relates to a wireless communication system. Most particularly, the present invention relates to a method and apparatus for controlling power for performing uplink transmission through multiple antennas.

BACKGROUND ART

In a wireless communication system, a power control method is used as a method for reducing a path-loss according to a distance between a base station and a user equipment and for reducing inter-cell interference due to an interference from a neighboring cell. A power control method corresponds to a method used by a wireless communication device for controlling transmission power, so that data can be transmitted at a lowest power level, while maintaining a certain quality of service (QoS) level. Most particularly, in a multi cell environment, user equipments that are located at a cell boundary region are mostly affected by path-loss, inter-cell interference, and so on. The user equipment should be capable of transmitting data by deciding an adequate transmission power level, so that the service quality can be prevented from being degraded due to path-loss, while the corresponding user equipment avoids interfering with other neighboring cells.

The conventional user equipment is equipped with only one power amplifier and is capable of only performing uplink transmission through 1 antenna port. Conversely, the conventional base station is equipped with multiple power amplifiers and is capable of performing downlink transmission through 1 antenna port or multiple antenna ports. Accordingly, in the conventional wireless communication system, a peak between uplink and downlink/asymmetry in an overall system throughput is/are considered as crucial drawbacks. Therefore, in order to enhance the uplink peak/asymmetry in the overall system throughput, it is now being considered that transmission through multiple antenna ports should also be adopted in an uplink.

DETAILED DESCRIPTION OF THE INVENTION

Technical Objects

Since it is assumed in the conventional wireless communication standard that a user equipment is equipped with a single power amplifier, an uplink power control according to the conventional wireless communication standard has been processed by using a method of adjusting the total uplink power. However, when multiple antennas are adopted for the uplink transmission, it is required to devise an adequate power control mechanism for the multiple antennas.

It is to be understood that objects to be achieved by the present invention are not limited to the aforementioned objects and other objects which are not mentioned will be apparent to those of ordinary skill in the art to which the present invention pertains from the following description.

Technical Solutions

According to an aspect of the present invention, in a user equipment being equipped with $N_t$ number of antenna ports (wherein $N_t>1$), provided herein is a method for controlling uplink power comprising: receiving a power control command for controlling transmission power of an uplink signal from a base station; and deciding a transmission power of the uplink signal by using the power control command; transmitting the uplink signal to the base station at the decided transmission power, wherein, when the number of used antenna ports used for the transmission of the uplink signal is equal to N1 (wherein N1 is a positive integer equal to or less than $N_t$), the power control command may be mapped to a first correction value, so that the transmission power can be decided based upon the first correction value, and when the number of used antenna ports is equal to N2 (wherein N1≠N2, and wherein N2 is a positive integer equal to or less than $N_t$), the power control command may be mapped to a second correction value, so that the transmission power can be decided based upon the second correction value.

According to another aspect of the present invention, as a user equipment being equipped with $N_t$ number of antenna ports (wherein $N_t>1$), the user equipment includes a receiver configured to receive a power control command for controlling transmission power of an uplink signal from a base station; and a processor configured to decide a transmission power of the uplink signal by using the power control command; a transmitter configured to transmit the uplink signal to the base station at the decided transmission power, wherein, when the number of used antenna ports used for the transmission of the uplink signal is equal to N1 (wherein N1 is a positive integer equal to or less than $N_t$), the processor may map the power control command to a first correction value, so as to decide the transmission power based upon the first correction value, and when the number of used antenna ports is equal to N2 (wherein N1≠N2, and wherein N2 is a positive integer equal to or less than $N_t$), the processor may map the power control command to a second correction value, so as to decide the transmission power based upon the second correction value.

According to both aspects of the present invention, the number of used antenna ports may be decided based upon precoding matrix indication information, wherein the precoding matrix indication information is received from the base station.

According to both aspects of the present invention, transmitting the uplink signal at the decided power may be further included.

The aforementioned technical solutions are only a part of the embodiments of the present invention, and various modifications to which technical features of the present invention are applied could be understood by the person with ordinary skill in the art to which the present invention pertains, based on the following detailed description of the present invention.

Effects of the Invention

According to the present invention, in a wireless communication system, an uplink power may be more efficiently controlled.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 11 and FIG. 12 illustrate examples for mapping a TPC command and power correction factors according to an exemplary embodiment of the present invention.

BEST MODE FOR CARRYING OUT THE PRESENT INVENTION

Figure 1:
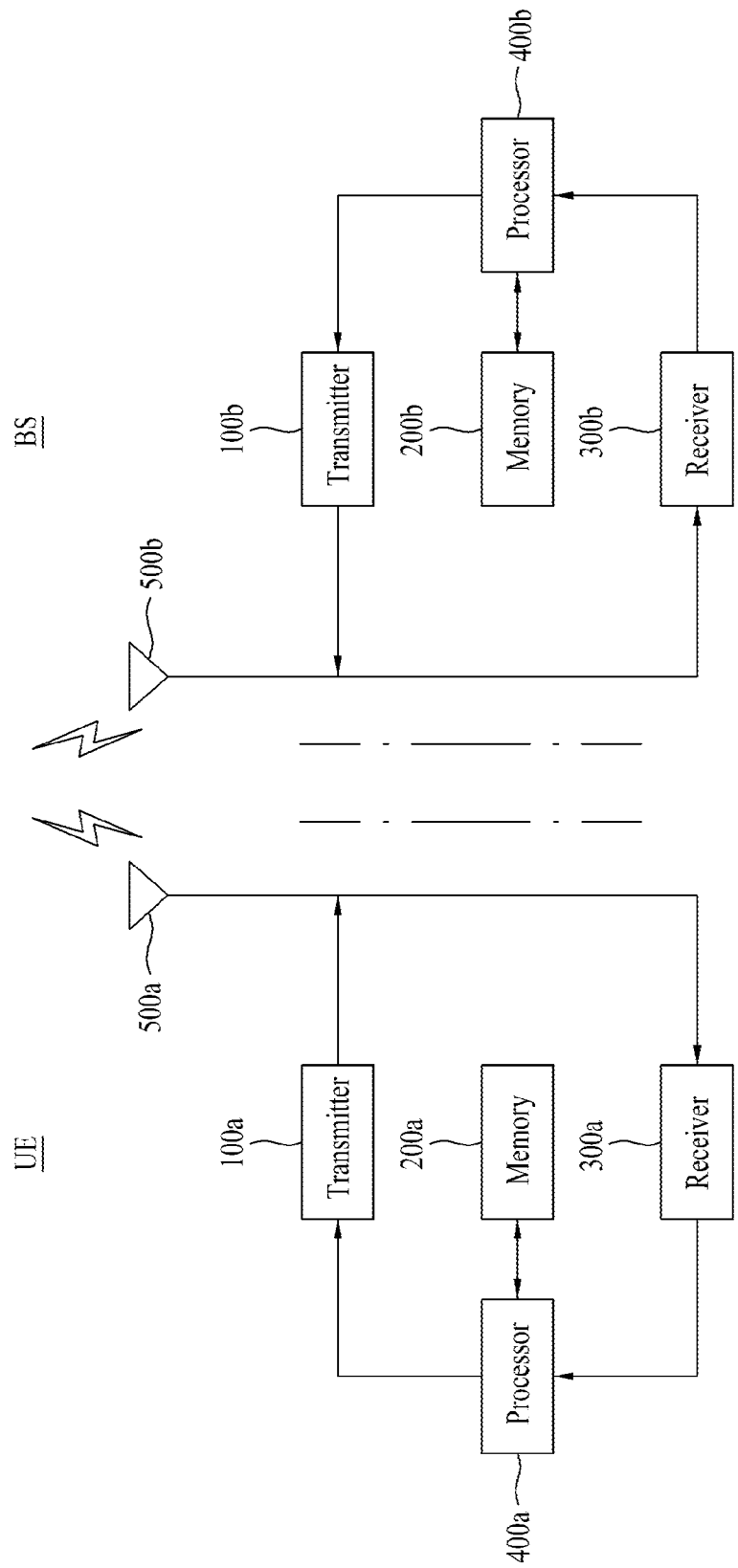
FIG. 1 is a block diagram of a user equipment (UE) and a base station (BS) for implementing the present invention.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

Techniques, apparatuses and systems described herein can be used in various wireless access technologies such as CMDA (code division multiple access), FDMA (frequency division multiple access), TDMA (time division multiple access), OFDMA (orthogonal frequency division multiple access), SC-FDMA (single carrier frequency division multiple access), and so on. The CDMA may be implemented with a radio technology such as UTRA (Universal Terrestrial Radio Access) or CDMA2000. The TDMA may be implemented with a radio technology such as GSM (Global System for Mobile communication), GPRS (General Packet Radio Service), EDGE (Enhanced Data Rates for GSM Evolution), and so on. The OFDMA may be implemented with a radio technology such as IEEE (Institute of Electrical and Electronics Engineers) 802.11 (Wi-Fi), IEEE 802.16 (WiMAX), IEEE 802.20, E-UTRA (Evolved-UTRA), and so on. The UTRA is a part of UMTS (Universal Mobile Telecommunication System). 3GPP (3rd Generation Partnership Project) LTE (Long Term Evolution) is a part of E-UMTS using E-UTRA. The 3GPP LTE employs OFDMA for downlink and employs SC-FDMA for uplink. LTE-A (LTE-Advanced) is an evolution (or evolved version) of 3GPP LTE. For clarity, this application focuses on the 3GPP LTE/LTE-A. However, technical features of the present invention are not limited thereto. For example, although the following description will be made based on a mobile communication system corresponding to a 3GPP LTE/LTE-A system, the following description may also be applied to other mobile communication systems excluding the unique features of the 3GPP LTE/LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a UE (User Equipment) may denote a fixed type UE or a mobile UE. Examples of the UE may include various equipments that transmit and receive user data and/or diverse of control information to and from a Base Station (BS). The UE may also be referred to as, a Terminal Equipment (TE), an MS (Mobile Station), an MT (Mobile Terminal), a UT (User Terminal), an SS (Subscriber Station), a wireless device, a PDA (Personal Digital Assistant), a wireless modem, a handheld device, and so on. Also, in the present invention, the Base Station (BS) refers to a fixed station that performs communication with a user equipment (UE) and/or another BS, so as to exchange diverse types of data and control information with the UE and/or the other BS. The BS may be referred to other terms, such as eNB (evolved-Node B), BTS (Base Transceiver System), AP (Access Point), and so on.

In the present invention, if a specific signal is allocated to a frame/subframe/slot/carrier/subcarrier, it signifies that the specific signal is transmitted through a respective carrier/subcarrier during a period/timing of the corresponding frame/subframe/slot/symbol.

In the present invention, a rank or transmission rank refers to the number of layers multiplexed/allocated to an OFDM symbol or data RE (Resource Element).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of resource elements (REs) carrying Downlink Control Information (DCI), a set of REs carrying Control Format Indicator (CFI), a set of REs carrying downlink ACK/NACK (ACKnowlegement/Negative ACK), and a set of REs carrying DL data, respectively. In addition, a Physical Uplink Control CHannel (PUCCH), a Physical Uplink Shared CHannel (PUSCH), and a Physical Random Access CHannel) (PRACH) may indicate a set of REs carrying Uplink Control Information (UCI), a set of REs carrying UL data, and a set of REs carrying a random access signal, respectively. In the present invention, RE that is assigned to or pertains to PDCCH/PCFICH/PHICH/PDSCH/PUCCH/PUSCH/PRACH may be called PDCCH/PCFICH/PHICH/PDSCH/PUCCH/PUSCH/PRACH RE or PDCCH/PCFICH/PHICH/PDSCH/PUCCH/PUSCH/PRACH resource.

Therefore, in the present invention, PUCCH/PUSCH/PRACH transmission of a UE may be conceptually identical to uplink (UL) control information/uplink (UL) data/random access signal transmission on PUSCH/PUCCH/PRACH, respectively. In addition, PDCCH/PCFICH/PHICH/PDSCH transmission of a BS may be conceptually identical to downlink (DL) data/control information transmission on PDCCH/PCFICH/PHICH/PDSCH, respectively.

FIG. 1 is a block diagram of a user equipment (UE) and a base station (BS) for implementing the present invention.

The UE serves as a transmitting apparatus on the uplink and as a receiving apparatus on the downlink. In contrast, the BS may serve as a receiving apparatus on the uplink and as a transmitting apparatus on the downlink.

Each of the UE and the BS includes an antenna (500a, 500b) for receiving information, data, signals, and/or messages, a transmitter (100a, 100b) for transmitting messages by controlling the antenna (500a, 500b), a receiver (300a, 300b) for receiving messages by controlling the antenna (500a, 500b), and a memory (200a, 200b) for storing information associated with performing communication in the wireless communication system. Each of the UE and the BS further includes a processor (400a, 400b), which is applied to perform the present invention by controlling the components of the UE and the BS, such as the transmitters (100a, 100b), the receivers (300a, 300b), and the memories (200a, 200b). The transmitter (100a), the memory (200a), the receiver (300a), and the processor (400a) of the UE may be configured as independent components on separate chips or their separate chips may be incorporated into a single chip. Likewise, the transmitter (100b), the memory (200b), the receiver (300b), and the processor (400b) in the BS may be configured as independent components on separate chips or two or more components may be incorporated to configure a single chip. The transmitter and the receiver may be configured as a single transceiver in the UE or the BS.

The antennas (500a, 500b) transmit signals generated from the transmitters (100a, 100b) to the outside, or transfer radio signals received from the outside to the receivers (300a, 300b). The antennas (500a, 500b) may be referred to as antenna ports. Each antenna port may correspond to one physical antenna or may be configured as a combination of more than one physical antenna element. In either case, the signal transmitted from each antenna port is not designed to be further deconstructed by the UE receiver (300a). The transmitted reference signal corresponding to a given antenna port defines the antenna port from the point of the UE, and enables the UE to perform channel estimation for the corresponding antenna port, regardless of whether or not it represents a single radio channel from one physical antenna or a composite channel from a plurality of physical antenna elements collectively comprising the antenna port. If the transmitters (100a, 100b) and/or the receivers (300a, 300b) support a MIMO (Multiple Input Multiple Output) function using a plurality of antennas, each block may be connected to two or more antennas.

The processors (400a, 400b) generally provide overall control to the modules of the UE and the BS. More specifically, the processors (400a, 400b) may carry out a control function for performing the present invention, a MAC (Medium Access Control) frame variable control function based on service characteristics and a propagation environment, a power saving mode function for controlling idle-mode operations, a handover function, and an authentication and encryption function. The processors (400a, 400b) may also be referred to as controllers, microcontrollers, microprocessors, microcomputers, and so on. The processors (400a, 400b) may be configured in the form of hardware, firmware, and software, or as a combination of hardware, firmware, and software. When configured in the form of hardware, the processors (400a, 400b) may be provided with one or more ASICs (Application Specific Integrated Circuits), DPSs (Digital Signal Processors), DSPDs (Digital Signal Processing Devices), PLDs (Programmable Logic Devices), and/or FPGAs (Field Programmable Gate Arrays), for implementing the present invention. When configured in the form of firmware or software, the firmware or software may be configured to include a module, a procedure, a function, and so on, for performing functions or operations of the present invention. The firmware or software may be provided in the processors (400a, 400b), or may be stored in the memories (200a, 200b) and may be operated by the processors (400a, 400b).

The transmitters (100a, 100b) perform predetermined coding and modulation for signals and/or data, which are scheduled by the processors (400a, 400b) or schedulers connected to the processors (400a, 400b) and transmitted to the outside, and then transfer the modulated signals and/or data to the antennas (500a, 500b). For example, the transmitters (100a, 100b) convert a transmission data stream to K number of layers by perform demultiplexing, channel coding, modulation, and so on. The K number of layers is transmitted through the antennas (500a, 500b) after being processed in transmission processors of the transmitters (100a, 100b). The transmitters (100a, 100b) and the receivers (300a, 300b) of the UE and the BS may be differently configured depending on the procedures of processing transmitted and received signals.

The memories (200a, 200b) may store programs required for signal processing and controlling of the processors (400a, 400b) and temporarily store input and output information. The memories (200a, 200b) may store predefined codebooks with respect to each rank. Each of the memories (200a, 200b) may be implemented into a flash memory-type storage medium, a hard disc-type storage medium, a multimedia card micro-type storage medium, a card-type memory (e.g., a SD or XD memories, and so on), a Random Access Memory (RAM), an SRAM (Static Random Access Memory), a Read-Only Memory (ROM), an EEPROM (Electrically Erasable Programmable Read-Only Memory), a PROM (Programmable Read-Only Memory), a magnetic memory, a magnetic disc, an optical disk, and so on.

Figure 2:
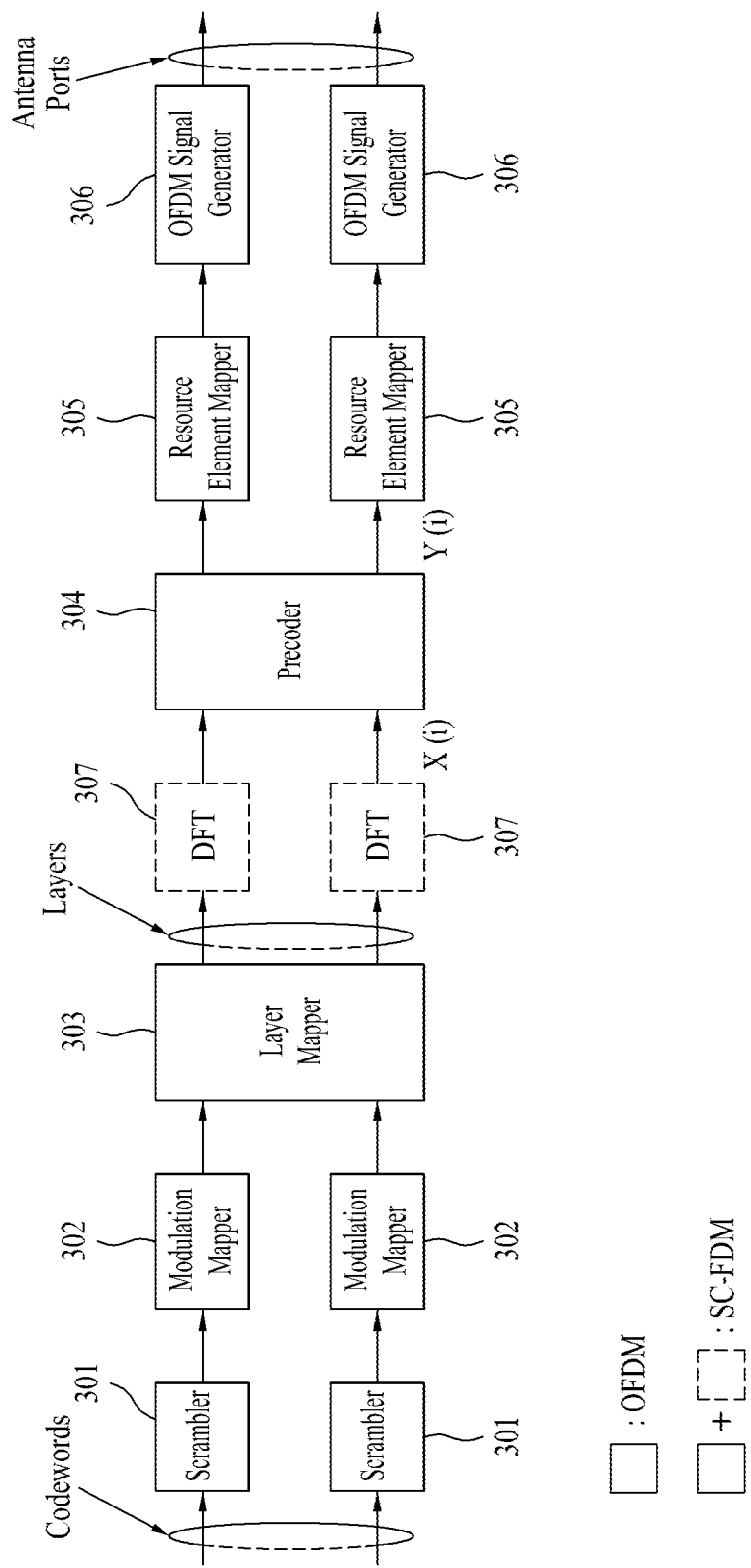
FIG. 2 is a block diagram of an exemplary transmitter in each of the UE and the BS.

FIG. 2 is a block diagram of an exemplary transmitter in each of the UE and the base station (BS). Operations of the transmitters (100a, 100b) will be described below in more detail with reference to FIG. 2.

Referring to FIG. 2, each of the transmitters (100a, 100b) within the UE and the base station (BS) includes a scrambler (301), a modulation mapper (302), a layer mapper (303), a precoder (304), an RE mapper (305), and an OFDM signal generator (306).

The transmitters (100a, 100b) may transmit more than one codeword. The scrambler (301) scrambles the coded bits of each codeword, for transmission on a physical channel. Herein, a codeword may be referred to as a data stream and is equivalent to a data block from the MAC layer. The data block from the MAC layer is referred to as a transport block.

The modulation mapper (302) may modulate the scrambled bits, thereby producing complex modulation symbols. The modulation mapper (302) may modulate the scrambled bits to complex modulation symbols representing positions on a signal constellation in a predetermined modulation scheme. The modulation scheme may correspond to any of m-PSK (m-Phase Shift Keying) and m-QAM (m-Quadrature Amplitude Modulation). However, the present invention will not be limited only to this.

The layer mapper (303) maps the complex modulation symbols to one or several transmission layers.

The precoder (304) may precode the complex modulation symbols on each layer, for transmission through the antenna ports. More specifically, the precoder (304) may generate antenna-specific symbols by processing the complex modulation symbols for multiple transmission antennas (500-1, . . . , 500-$N_t$) in a MIMO scheme, and may distribute the antenna-specific symbols to the RE mappers (305). More specifically, the precoder (304) may map the transmission layers to the antenna ports. The precoder 304 may multiply an output x of the layer mapper (303) by an $N_t \times M_t$ precoding matrix W and output the resulting product in the form of an $N_t \times M_F$ matrix z.

The RE mapper (305) may map/allocate the complex modulation symbols for the respective antenna ports to REs. The RE mapper (305) may allocate the complex modulation symbols for the respective antenna ports to appropriate subcarriers, and may multiplex the complex modulation symbols in accordance with the users.

The OFDM signal generator (306) may modulate the complex modulation symbols for the respective antenna ports, i.e., the antenna-specific symbols through OFDM or SC-FDM modulation, thereby producing a complex-valued time domain Orthogonal Frequency Division Multiplexing (OFDM) or Single Carrier Frequency Division Multiplexing (SC-FDM) symbol signal. The OFDM signal generator (306) may perform IFFT (Inverse Fast Fourier Transform) on the antenna-specific symbols and insert a CP (Cyclic Prefix) into the resulting IFFT processed time domain symbol. The OFDM symbol is transmitted through the transmission antennas (500-1, . . . , 500-$N_t$) to a receiver after performing digital-to-analog conversion, frequency uplink conversion (or up-conversion), and so on. The OFDM signal generator (306) may include an IFFT module, a CP inserter, a DAC (Digital-to-Analog Converter), a frequency uplink converter, and so on.

Meanwhile, if the transmitters (100a, 100b) adopt SC-FDM access (SC-FDMA) for transmitting a codeword, the transmitters (100a, 100b) may include a Discrete Fourier Transform module (307) (or a Fast Fourier Transform module). The Discrete Fourier Transform module performs DFT (Discrete Fourier Transform) or FFT (Fast Fourier Transform) (hereinafter, DFT/FFT) on the antenna-specific symbol, and, then, the Discrete Fourier Transform module outputs the DFT/FFT-processed symbol to the resource element mapper (305). This corresponds to a method of performing transmission by reducing SC-FDMA (Single Carrier FDMA), PAPR (Peak-to-Average Power Ratio) or CM (Cubic Metric) of a transmission signal. According to the SC-FDMA, the transmitted signal may be transmitted while avoiding a non-linear distortion section of the power amplifier. Accordingly, even the transmitter transmit the signal at a power level lower than the conventional OFDM method, the receiver may be capable of receiving a signal that satisfies a predetermined intensity and error ratio. More specifically, according to the SC-FDMA, the power consumption of the transmitting device may be reduced.

In a conventional OFDM signal generator, the signals that are carried over each subcarrier are processed with IFFT by a Multi Carrier Modulation (MCM) method, and as the processed signals are simultaneously transmitted in parallel, a decrease in the efficiency of the power amplifier occurs. Conversely, in the SC-FDMA, the information is first processed with DFT/FFT before mapping the signals to the subcarrier. Due to the DFT/FFT effect, the PAPR of the signals that have passed through the DFT/FFT module (307) increases. The DFT/FFT-processed signal is then mapped to the subcarrier by the resource element mapper (305), so as to be processed with IFFT, thereby being converted to a time-domain signal. More specifically, by having the SC-FDMA transmitter further perform DFT or FFT operation (or calculation) before the OFDM signal generator, the PAPR may be increased at the IFFT inputting end, and then, after being processed once again with IFFT, the PAPR of the final transmission signal is reduced. This format is similar to the DFT module (or FFT module) (307) being added in front of the conventional OFDM signal generator, and, therefore, the SC-FDMA may also be referred to as DFT-s-OFDM (DFT-spreaded OFDM).

The receivers (300a, 300b) operate in the reverse order to the signal processing procedure of the respective transmitters. More specifically, the receivers (300a, 300b) decode and demodulate radio signals received through the antennas (500a, 500b) from the outside and transfer the decoded and demodulated signals to the corresponding processors (400a, 400b). The antenna (500a, 500b) connected to each of the receivers (300a, 300b) may include $N_r$ number of reception antennas. A signal received through each reception antenna is down-converted to a baseband signal and then recovered to the original (or initial) data stream transmitted by the transmitter (100a, 100b) through multiplexing and MIMO demodulation. Each of the receivers (300a, 300b) may include a signal recovery unit for down-converting a received signal to a baseband signal, a multiplexer for multiplexing received signals, and a channel demodulator for demodulating the multiplexed signal stream to a codeword. The signal recovery unit, the multiplexer, and the channel decoder may be configured into an integrated module for performing the respective functions or may each be configured to an independent module. More specifically, the signal recovery unit may include an ADC (Analog-to-Digital Converter) for converting an analog signal to a digital signal, a CP remover for removing a CP from the digital signal, an FFT module for generating a frequency-domain symbol by performing FFT on the CP-removed signal, and an resource element (RE) demapper/equalizer for recovering antenna-specific symbols from the frequency-domain symbol. The multiplexer recovers transmission layers from the antenna-specific symbols and the channel demodulator recovers the codeword transmitted by the transmitter from the transmission layers.

If the receivers (300a, 300b) receive SC-FDM signals, each of the receivers (300a, 300b) further includes an Inverse Discrete Fourier Transform (IDFT) module (or IFFT module). The IDFT/IFFT module performs IDFT/IFFT on the antenna-specific symbols, which are recovered by the RE demapper, and outputs the IDFT/IFFT-processed symbol to the multiplexer.

For reference, although it has already been described above with reference to FIG. 1 and FIG. 2, each of the transmitters (100a, 100b) includes the scrambler (301), the modulation mapper (302), the layer mapper (303), the precoder (304), the RE mapper (305), and the OFDM signal generator (306), the processors (400a, 400b) of each transmitting device may be configured to include the scrambler (301), the modulation mapper (302), the layer mapper (303), the precoder (304), the RE mapper (305), and the OFDM signal generator (306). Similarly, although it has already been described above, with reference to FIG. 1 and FIG. 2, that each of the receivers (300a, 300b) includes the signal recovery unit, the multiplexer, and the channel demodulator, the processors (400a, 400b) of each receiving device may be configured to include the signal recovery unit, the multiplexer, and the channel demodulator. Hereinafter, for simplicity in the description of the present invention, it will be described that the scrambler (301), the modulation mapper (302), the layer mapper (303), the precoder (304), the RE mapper (305), and the OFDM signal generators (306) (DFT module (307) in case of the SC-FDMA method) are included in each transmitter (100a, 100b), which is configured as a separate block from the processors (400a, 400b), which control the operations of the respective blocks, and it will also be described that the signal recovery unit, the multiplexer, and the channel demodulator are included in each receiver (300a, 300b), which is configured as a separate block from the processors (400a, 400b), which control the operations of the respective blocks. However, in case the scrambler (301), the modulation mapper (302), the layer mapper (303), the precoder (304), the RE mappers (305), and the OFDM signal generator (306) (307) are included in each processor (400a, 400b), and in case the signal recovery unit, the multiplexer, and the channel demodulator (further including the IFFT module in case of the SC-FDMA method) are included in each processor (400a, 400b), the embodiments of the present invention may be identically applied.

Figure 3:
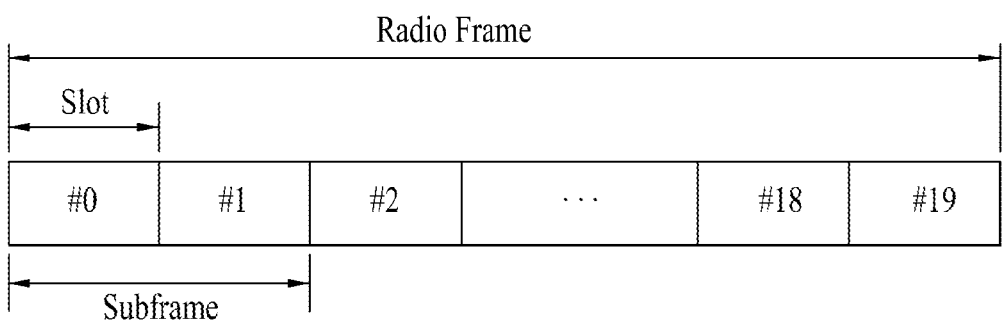
FIG. 3 illustrates an exemplary structure of a radio frame in a wireless communication system.

FIG. 3 illustrates an exemplary structure of a radio frame in a wireless communication system. Most particularly, the radio frame structure of FIG. 3 may be applied to an FDD (Frequency Division Duplex) mode, a half FDD (H-FDD) mode, and a TDD (Time Division Duplex) mode.

Referring to FIG. 3, a radio frame that is used in a 3GPP LTE/LTE-A may have the length of 10 ms (307,200 $T_S$) in duration, and may be configured of 10 subframes each having the same size. A number may be assigned to each of the 10 subframes within a single radio frame. Herein, $T_S$ represents a sampling time and is indicated as $T_S=1/(2048 \times 15 \text{ kHz})$. Each subframe has the length of 1 ms and is configured of two slots. Within each subframe, 20 slots are sequentially numbered from 0 to 19. A time interval (or period) during which one subframe is transmitted is defined as a TTI (Transmission Time Interval). A time resource may be differentiated by a radio frame number (also referred to as a radio frame index) and a subframe number (also referred to as a subframe number), a slot number (or slot index), and so on.

A radio frame may be differently configured depending upon a duplex mode. For example, in the FDD mode, since the downlink transmission and the uplink transmission may be differentiated by the frequency, the radio frame at a frequency includes either downlink subfames or uplink subfames.

Figure 4:
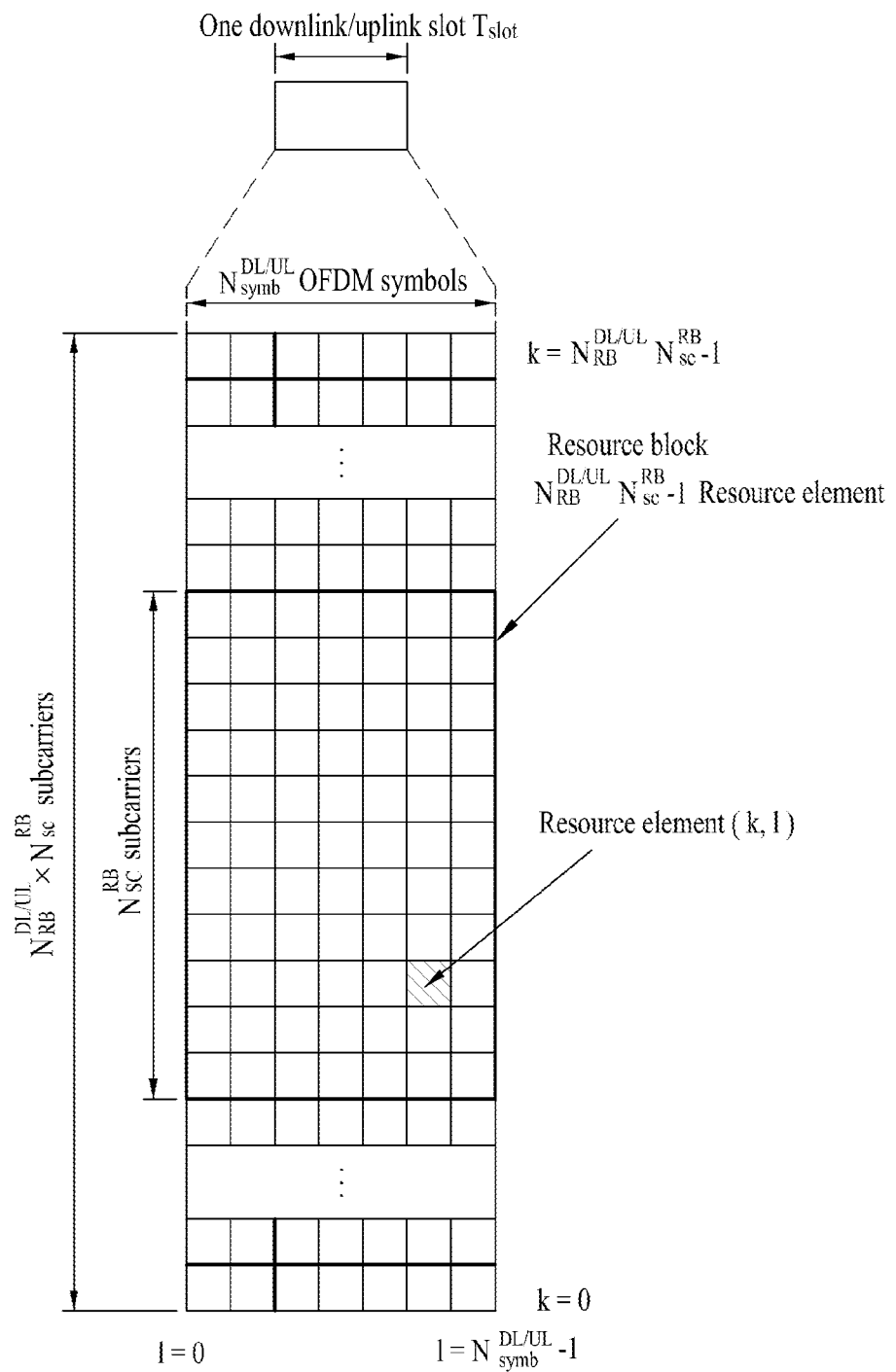
FIG. 4 illustrates an exemplary structure of a DownLink/UpLink (DL/UL) slot in the wireless communication system.

FIG. 4 illustrates an exemplary structure of a DL/UL (DownLink/UpLink) slot in the wireless communication system. Most particularly, FIG. 4 illustrates the structure of a resource grid in the 3GPP LTE/LTE-A system. Herein, one resource grid exists for one antenna port.

Referring to FIG. 4, a slot includes a plurality of OFDM symbols in the time domain and a plurality of Resource Blocks (RBs) in the frequency domain. An OFDM symbol may refer to one symbol duration (or period). An RB includes a plurality of subcarriers in the frequency domain. An OFDM symbol may be referred to as an OFDM symbol, an SC-FDM symbol, and so on, depending upon the multiple access scheme. The number of OFDM symbols per slot may vary depending upon a channel bandwidth and a CP length. For instance, one slot includes 7 OFDM symbols in case of a normal CP, whereas one slot includes 6 OFDM symbols in case of an extended CP. Although it is shown in FIG. 4, an exemplary subframe is shown to have a slot with 7 OFDM symbols, embodiments of the present invention are also applicable to subframes with any other number of OFDM symbols. A resource including one OFDM symbol and one subcarrier is referred to as a Reference Element (RE) or a tone.

Referring to FIG. 4, a signal transmitted in each slot may be described by a resource grid including $N^{DL/UL}_{RB}N^{RB}_{SC}$ number of subcarriers and $N^{DL/UL}_{symb}$ number of OFDM or SC-FDM symbols. $N^{DL}_{RB}$ represents the number of RBs in a DL slot and $N^{UL}_{RB}$ represents the number of RBs in a UL slot. Herein, $N^{DL}_{RB}$ is dependent to a DL transmission bandwidth, and $N^{UL}_{RB}$ is dependent to a UL transmission bandwidth. Each OFDM symbol includes $N^{DL/UL}_{RB}N^{RB}_{SC}$ number of subcarriers in a frequency domain. The number of subcarriers mapped to one carrier is determined according to the FFT size. The subcarriers may be classified into a data subcarrier for data transmission, a reference signal (RS) subcarrier for RS transmission, and a null subcarrier for a guard band and DC component. The null subcarrier for the DC component is an unused subcarrier, and is mapped to a carrier frequency ($f_0$) during the OFDM signal generation process. The carrier frequency may also be referred to as a center frequency. $N^{DL}_{symb}$ represents the number of OFDM or SC-FDMA symbols in the DL slot, $N^{UL}_{symb}$ represents the number of OFDM or SC-FDMA symbols in the UL slot, and $N^{RB}_{SC}$ represents the number of subcarriers in one RB.

In other words, a Physical Resource Block (PRB) is defined as $N^{DL/UL}_{symb}$ number of consecutive OFDM symbols or SC-FDMA symbols in the time domain and $N^{RB}_{SC}$ number of consecutive subcarriers in the frequency domain. Therefore, one PRB includes $N^{DL/UL}_{symb} \times N^{RB}_{SC}$ number of REs.

Each RE in the resource grid per each antenna port may be uniquely identified by an index pair (k, 1) in a slot. Herein, k is a frequency-domain index ranging from 0 to $N^{DL/UL}_{RB} \times N^{RB}_{SC}-1$, and 1 is a time-domain index ranging from 0 to $N^{DL/UL}_{symb}-1$.

Figure 5:
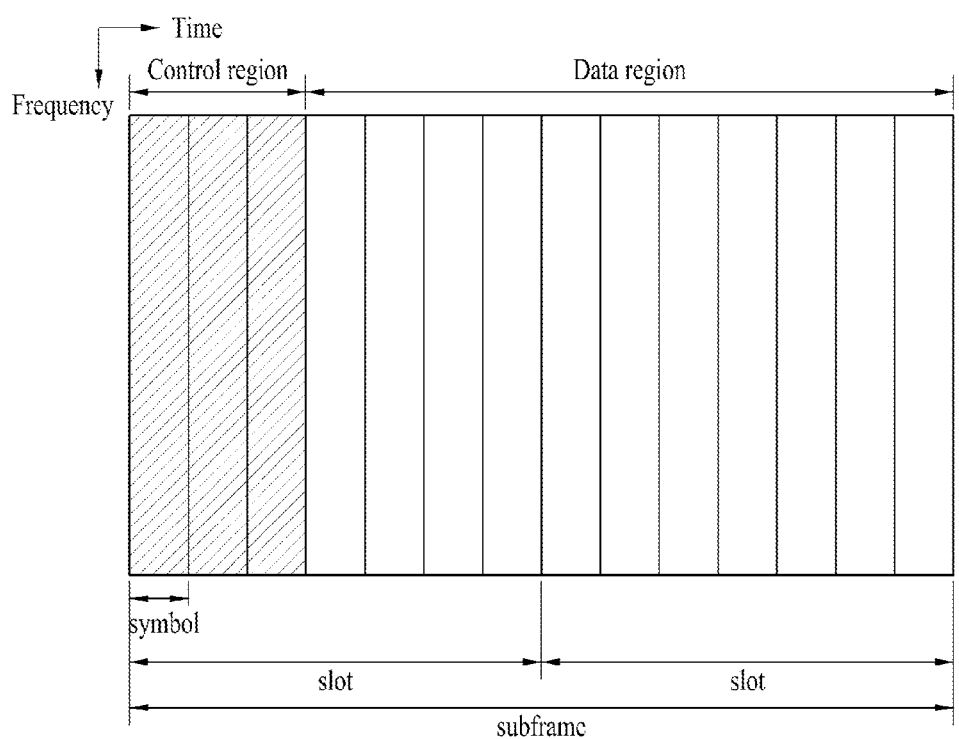
FIG. 5 illustrates an exemplary structure of a downlink (DL) subframe in the wireless communication system.

FIG. 5 illustrates an exemplary structure of a downlink (DL) subframe in the wireless communication system.

Referring to FIG. 5, each subframe may be divided into a control region and a data region. The control region includes one or more OFDM symbols, starting from the first OFDM symbol. The number of OFDM symbols used for the control region of a subframe may be set independently on a subframe basis and signaled on a PCFICH (Physical Control Format Indicator CHannel). A BS may transmit control information to a UE or UEs in the control region. In order to transmit control information, a PDCCH (Physical Downlink Control CHannel), a PCFICH, a PHICH (Physical Hybrid automatic retransmit request Indicator CHannel), and so on, may be allocated to the control region.

The BS may transmit information related to resource allocation of a PCH (Paging channel) and DL-SCH (Downlink-shared channel), an uplink scheduling grant, HARQ information, Downlink Assignment Index (DAI), Transmitter Power Control (TPC) command, and so on, to each UE or each UE group on a PDCCH.

The BS may transmit data to a UE or UE group in the data region. Data transmitted in the data region is referred to as user data. A PDSCH (Physical Downlink Shared CHannel) may be allocated to the data region to convey data. PCH (Paging channel) and DL-SCH (Downlink-shared channel) may be transmitted on a PDSCH. The user equipment may decode the control information being transmitted through the PDCCH, so as to be capable of reading the data being transmitted through the PDSCH. Herein, information indicating how the user equipment or user equipment group receives the PDSCH data, information indicating how the received PDSCH data are to be decoded, and so on, is included in the PDCCH.

The PDDCH is transmitted in a combination format of at least one or more consecutive Control Channel Elements (CCEs). A CCE corresponds to a logical allocation unit being used for providing a PDCCH at a coding rate based upon a status of the radio channel. The CCE corresponds to multiple resource element groups. The format of the PDCCH and the number of available bits is decided based upon a correlation between the number of CCEs and the coding rate being provided by the CCE. The base station may decide the PDCCH format in accordance with the DCI, which is being transmitted to the user equipment, and may also add Cyclic Redundancy Check (CRC) to the control information. The CRC is masked with an identifier referred to as a Radio Network Temporary Identifier (RNTI) based upon the downer or purpose of the PDCCH.

Multiple PDCCHs may be transmitted on the control region. The UE may monitor the multiple PDCCHs so as to detect its own PDCCH. The DCI carried by one PDCCH has different sizes and usage purposes according to a PUCCH format, and, herein, the DCI size may also be changed in accordance with a coding rate.

The following table shows an exemplary DCI format in accordance with the usage purpose.

TABLE 1

| DCI format | Objectives |
| --- | --- |
| 0 | UL scheduling of PUSCH |
| 1 | DL scheduling of one PDSCH codeword |
| 1A | DL scheduling of compact scheduling (single antenna port, port 0 or TxD (Transmit Diversity) can be used) |
| 1B | DL scheduling of closed-loop single-rank transmission |
| 1C | DL scheduling of compact format |
| 1D | DL scheduling of single layer MU-MIMO transmission mode |
| 2 | DL scheduling of rank-adapted closed-loop spatial multiplexing mode |
| 2A | DL scheduling of rank-adapted open-loop spatial multiplexing mode |
| 2B | DL scheduling of dual-layer beamforming using antenna port 7, port 8 |
| 3 | TPC commands for PUCCH and PUSCH with 2-bit power adjustments |
| 3A | TPC commands for PUCCH and PUSCH with 1-bit power adjustments |

The DCI format may be independently applied to each UE. PDCCHs of multiple UEs may be multiplexed in one subframe. PDCCH of each UE may be independently channel-coded such that a CRC (Cyclic Redundancy Check) may be added to the PDCCH. The CRC is masked with a unique ID, which is referred to as a Radio Network Temporary Identifier (RNTI) in accordance with the transmission target or transmission purpose in order to allow each UE to receive its own PDCCH. For example, if the PDCCH corresponds to a PDCCH respective to a TPC command for a physical uplink control channel (PUCCH), a TPC-PUCCH-RNTI may be masked to the CRC, and if the PDCCH corresponds to a PDCCH respective to a TPC command for a physical uplink shared channel (PUSCH), a TPC-PUSCH-RNTI may be masked to the CRC. Essentially, however, since the UE is unaware of the position to which its own PDCCH is being transmitted, the UE performs blind detection (also referred to as blind decoding) on all PDCCHs having the corresponding DCT format for each subframe, until the PDCCH having its identifier is received.

For example, it will be assumed that a specific PDCCH is CRC-masked with a Radio Network Temporary Identity (RNTI) referred to as "A", and information that is transmitted using radio resources "B" (e.g., a frequency position (or location)) and transmission format information "C" (e.g., a transmission block size, a modulation scheme, coding information, and so on), is transmitted through a specific subframe. In this case, a UE located within a corresponding cell uses the RNTI information it is assigned with, so as to monitor the PDCCH. Then, the UE having RNTI "A" detects the PDCCH, and by using the information on the received PDDCH, the UE may detect the PDSCH, which is indicated by "B" and "C".

Figure 6:
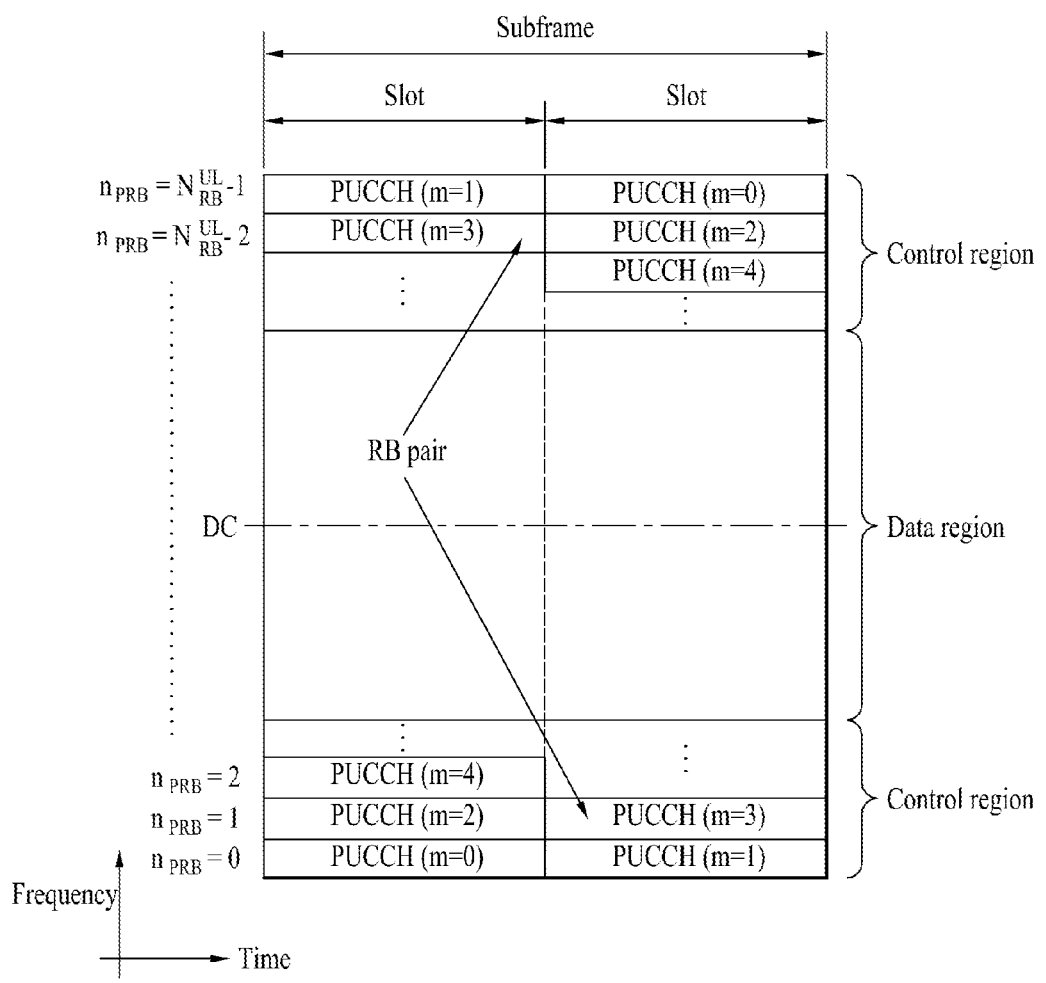
FIG. 6 illustrates an exemplary structure of an uplink (UL) subframe in the wireless communication system.

FIG. 6 illustrates an exemplary structure of an uplink (UL) subframe in the wireless communication system.

Referring to FIG. 6, a UL subframe may be divided into a data region and a control region in the frequency domain. One or more PUCCHs (Physical Uplink Control CHannels) may be allocated to the control region so as to deliver UCI (Uplink Control Information). One or more PUSCHs (Physical Uplink Shared Channels) may be allocated to the data region so as to deliver user data.

In a UL subframe, subcarriers distantly located from a Direct Current (DC) subcarrier may be used as a control region. In other words, subcarriers being located at both ends of a UL transmission bandwidth are assigned for UL control information transmission. The DC subcarrier is reserved without being used in signal transmission, and are mapped to a carrier frequency ($f_0$) in a frequency up-conversion process performed by the OFDM/SC-FDM signal generator (306).

A PUCCH for a UE is allocated to an RB pair in a subframe. And, the RBs of the RB pair occupy different subcarriers in two slots. The PUCCH that is being allocated as described above may be expressed as a PUCCH having the RB pair allocated thereto being frequency-hopped within a slot boundary. However, if the frequency hopping is not applied, the RB pair may occupy the same subcarriers. Regardless of whether or not frequency-hopping is being applied, since the PUCCH respective to one UE is allocated to one RB pair within one subframe, the same PUCCH may be transmitted once and transmitted twice through a single RB of each slot included in one UL subframe.

Uplink Transmission Power Control

In the conventional system, uplink transmission power control is based on closed-loop correction and/or open-loop power control. The open-loop power control is processed by calculation performed by the User Equipment (UE), and the closed-loop power control is performed by a power control command from the base station (or evolved Nod B (eNB)).

An uplink Transmit Power Control (TPC) command may be defined in a DCI format of a PDCCH and may be provided to the user equipment from the base station through the PDCCH. For example, DCI format 3 and DCI format 3A of the PDCCH correspond to uplink transmit power control and may include group TPC command for a user equipment group. When the PDCCH including DCI formats 3/3A is associated with a PUCCH transmit power control, TPC-PUCCH-RNTI may be masked (or scrambled) to a CRC parity bit of the PDCCH. And, when the PDCCH including DCI formats 3/3A is associated with a PUSCH transmit power control, TPC-PUSCH-RNTI may be masked (or scrambled) to a CRC parity bit of the PDCCH. The user equipment may perform blind decoding on DCI formats 3/3A existing within a common search space in a downlink by using the respective RNTI (e.g., TPC-PUCCH-RNTI or TPC-PUSCH-RNTI). Then, after acquiring the DCI format 3/3A information, the user equipment may use a TPC-index parameter, which is provided from a higher layer (e.g., RRC layer), so as to find a TPC command being provided to the corresponding user equipment within the DCI formats 3/3A. Then, an uplink (PUCCH or PUSCH) transmit power level may be decided by applying a respective TPC command value to a power control equation.

Figure 7:
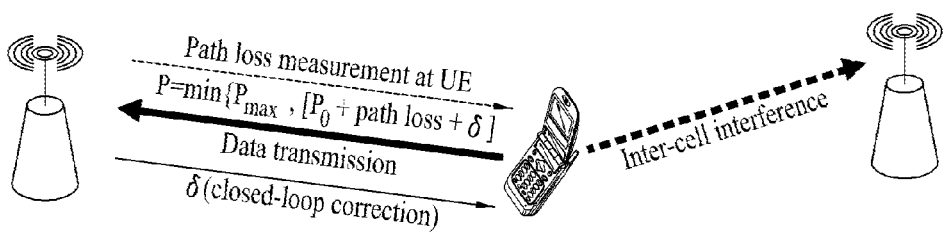
FIG. 7 illustrates a basic concept of an uplink power control.

FIG. 7 illustrates a basic concept of an uplink power control.

The uplink power control decides an average power during a predetermined time period, e.g., one OFDM symbol of the corresponding physical channel (e.g., PUSCH, PUCCH, SRS, and so on). Referring to FIG. 7, the uplink power is mostly measured by the user equipment by using the closed-loop method, and the BS may control the uplink power by using a closed-loop correction factor δ.

Figure 8:
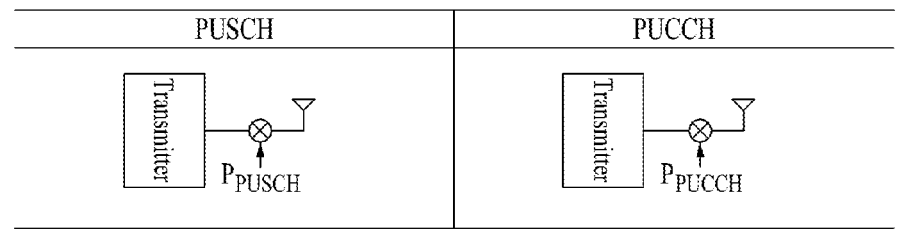
FIG. 8 illustrates a general structure of an uplink transmitter, which is equipped with a single antenna port in an LTE system.

FIG. 8 illustrates a general structure of an uplink transmitter, which is equipped with a single antenna port in an LTE system.

An uplink transmitter of an LTE system is equipped with only one power amplifier. Therefore, when a transmission power (or transmit power) of an uplink physical channel is decided, the uplink physical channel is transmitted from an antenna port, which is connected with the uplink transmitter, at the decided transmission power.

Referring to FIG. 8, for example, one PUSCH may be transmitted at a PUSCH transmission power $P_{PUSCH}$ at a predetermined time period, and one PUCCH may be transmitted at a PUCCH transmission power $P_{PUCCH}$ at a predetermined time period.

For example, the transmission power of the PUSCH may be calculated by using Equation 1 shown below.

$$P_{PUSCH}(i) = \min\{P_{MAX}, 10\log_{10}(M(i)) + P_O(j) + \alpha(i) \cdot PL + \Delta_{TF}(i) + f(i)\} \quad \text{Equation 1}$$

In Equation 1, a unit of $P_{PUSCH}(i)$ corresponds to dBm. In Equation 1, i represents a time index (or subframe index), $P_{MAX}$ represents a maximum allowed power, and the maximum allowed power depends the class of the user equipment. Additionally, M(i) is decided based upon the number of allocated resource blocks which can be vary from 1 to 110. Herein, M(i) is updated for each subframe. α·PL is used for path-loss compensation, wherein PL represents downlink path-loss estimated by the user equipment, and wherein α is a scaling value equal to or less than 1, which is expressed as a 3-bit value. When α is equal to 1, the path-loss is completely compensated. And, when α is less than 1, the path-loss is partially compensated.

In Equation 1, $P_O(j)$ may be calculated by using Equation 2 shown below.

$$P_O(j) = P_{O\_CELL\_SPECIFIC}(j) + P_{O\_UE\_SPECIFIC}(j) \quad \text{Equation 2}$$

In Equation 2, $P_{O\_CELL\_SPECIFIC}(j)$ is cell-specifically provided by a higher layer, and $P_{O\_UE\_SPECIFIC}(j)$ is UE-specifically provided by a higher layer. Herein, j may be decided in accordance with the characteristics of the PUSCH transmission. For example, j=0 for a PUSCH (re-)transmission corresponding to a semi-persistent grant, j=1 for a PUSCH (re-) transmission corresponding to a dynamically scheduled grant, and j=2 for a PUSCH (re-) transmission corresponding to a random access response grant.

In Equation 1, $\Delta_{TF}(j)$ corresponds to a value that is decided based upon a value, which is UE-specifically provided by a higher layer.

In Equation 1, as a UE-specific parameter that is controlled by the base station, f(i) may be defined as shown below.

$$f(i) = f(i-1) + \delta_{PUSCH}(i - K_{PUSCH}) \quad \text{Equation 3}$$

In Equation 3, as a UE-specific correction value, $\delta_{PUSCH}$ may also be referred to as a Transmission (or Transmit) Power Control (TPC) command. $\delta_{PUSCH}$ is either included in the PDCCH of DCI format 0, or $\delta_{PUSCH}$ may be joint-coded in the PDCCH of DCI formats 3/3A along with other TPC commands. For example, $\delta_{PUSCH}(i - K_{PUSCH})$ may correspond to a value that is signaled on PDCCH with DCI format 0 or DCI formats 3/3A in subframe $i - K_{PUSCH}$. When accumulation of $\delta_{PUSCH}$ is enabled, f(0) is the first value after the reset of the accumulation. When the accumulation of $\delta_{PUSCH}$ is disabled by a higher layer, f(i)=f(i-1).

Depending upon the number of bits for the TPC command, $\delta_{PUSCH}$ may be defined as shown in Table 2 and Table 3. Table 2 may be used when 2 bits are used for the TPC command in DCI formats 0/3, and Table 3 may be used when 1 bit is used for the TPC command in DCI format 3A.

TABLE 2

| TPC Command Field in DCI format 0/3 | Accumulated $\delta_{PUSCH}$ [dB] | Absolute $\delta_{PUSCH}$ [dB] only DCI format 0 |
|---|---|---|
| 0 | −1 | −4 |
| 1 | 0 | −1 |
| 2 | 1 | 1 |
| 3 | 3 | 4 |

TABLE 3

| TPC Command Field in DCI format 3A | Accumulated $\delta_{PUSCH}$ [dB] |
|---|---|
| 0 | −1 |
| 1 | 1 |

Referring to FIG. 8, the UE, which is equipped with a single antenna port, PUSCH transmission may be performed in subframe i, at $P_{PUSCH}(i)$, which is decided as described above.

Meanwhile, the power control for the PUCCH may be defined as shown below.

$$P_{PUCCH}(i) = \min\{P_{MAX}, P_{0\_PUCCH} + PL + h(n_{CQI}, n_{HARQ}) + \Delta_{F\_PUCCH}(F) + g(i)\} \quad \text{Equation 4}$$

In Equation 4, a unit of $P_{PUCCH}(i)$ corresponds to dBm. In Equation 4, $\Delta_{F\_PUCCH}(F)$ is provided by a higher layer, and each $\Delta_{F\_PUCCH}(F)$ corresponds to PUCCH format (F), which is related with PUCCH format 1a. Each PUCCH format may be defined as shown below.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + BPSK | 22 | CQI/PMI/RI + ACK/NACK | Normal CP only |
| 3 | QPSK | 48 | ACK/NACK or SR + ACK/NACK or CQI/PMI/RI + ACK/NACK | |

In Equation 4, $h(n_{CQI}, n_{HARQ})$ corresponds to a PUCCH format dependent value, wherein $n_{CQI}$ corresponds to a number of information bits for channel quality information, and wherein $n_{HARQ}$ corresponds to a number of HARQ (Hybrid Automatic Repeat request) bits.

With respect to PUCCH formats 1, 1a, and 1b, $h(n_{CQI}, n_{HARQ})$ may be defined as described below.

$$h(n_{CQI}, n_{PUSCH}) = 0 \quad \text{Equation 5}$$

With respect to PUCCH formats 2, 2a, and 2b and a normal cyclic prefix, $h(n_{CQI}, n_{HARQ})$ may be defined as described below.

$$h(n_{CQI}, n_{HARQ}) = \begin{cases} 10\log_{10}\left(\frac{n_{CQI}}{4}\right) & \text{if } n_{CQI} \geq 4 \\ 0 & \text{otherwise} \end{cases} \quad \text{Equation 6}$$

With respect to PUCCH format 2 and an extended cyclic prefix, $h(n_{CQI}, n_{HARQ})$ may be defined as described below.

$$h(n_{CQI}, n_{HARQ}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases} \quad \text{Equation 7}$$

In Equation 7, $P_{O\_PUCCH}(j)$ corresponds to a parameter configured of a sum of $P_{O\_NOMINAL\_PUCCH}(j)$ and $P_{O\_NOMINAL\_SPECIFIC}(j)$. Herein, $P_{O\_NOMINAL\_PUSCH}(j)$ is cell-specifically provided by a higher layer, and $P_{O\_UE\_SPECIFIC}(j)$ is UE-specifically provided by a higher layer.

In Equation 4, g(i) represents a current PUCCH power control adjustment state, which may be defined as shown below.

$$g(i) = g(i-1) + \sum_{m=0}^{M-1} \delta_{PUCCH}(i - k_m) \quad \text{Equation 8}$$

Equation 8, g(0) represents a first value after the rest. In case of the FDD, M=1 and $k_0$=4, and, in case of TDD, M and $k_m$ may be defined as shown below in the following table.

TABLE 5

| UL-DL Configuration | Downlink association set index K: $\{k_0, k_1, \ldots k_{M-1}\}$ for TDD | | | | | | | | |
|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |
| 0 | 0 | 1 | 2 | 3 | 4 | 5 | 6 | 7 | 8 | 9 |

In Equation 8, as a UE-specific correction value, $\delta_{PUCCH}$ may also be referred to as a Transmission Power Control (TPC) command. $\delta_{PUCCH}$ may be provided to a UE, which is included in the PDCCH of DCI formats 1A/1B/1D/2A/2/2B, or $\delta_{PUCCH}$ may be coded along with another UE-specific PUCCH correction value, thereby being provided to a UE on the PDCCH of DCI formats 3/3A. A CRC parity bit of the PDCCH of DCI formats 3/3A is scrambled along with TPC-PUCCH-RNTI (Radio Network Temporary Identifier).

Depending upon the DCI format, the TPC command may be mapped to $\delta_{PUCCH}$ as shown in Table 5 and Table 5. Table 6 shows a mapping relation between TPC commands of DCI formats 1A/1B/1D/1/2A/2/3 and $\delta_{PUCCH}$, and Table 7 shows a mapping relation between a TPC command of DCI format 3A and $\delta_{PUCCH}$.

TABLE 6

| TPC Command Field in DCI format 1A/1B/1D/1/2A/2B/2/3 | $\delta_{PUCCH}$ [dB] |
|---|---|
| 0 | −1 |
| 1 | 0 |
| 2 | 1 |
| 3 | 3 |

TABLE 7

| TPC Command Field in DCI format 3A | $\delta_{PUCCH}$ [dB] |
|---|---|
| 0 | −1 |
| 1 | 1 |

Referring to FIG. 8, an UE that is equipped with a single antenna port may perform PUCCH transmission in subframe i at $P_{PUCCH}(i)$, which is decided as described above, through the single antenna port.

Meanwhile, apart from PUCCH and PUSCH, a Sounding Reference Signal (SRS) may have its power controlled by using Equation 9 shown below.

$$P_{SRS}(i) = \min\{P_{MAX}, P_{SRS\_OFFSET} + 10\log_{10}(M_{SRS}) + P_{O\_PUSCH}(j) + \alpha \cdot PL + f(i)\} \quad \text{Equation 9}$$

In Equation 9, a unit of $P_{SRS}(i)$ corresponds to dBm. Herein, i represents a time index (or subframe index), $P_{MAX}$ represents a maximum allowed power (or maximum power), and the maximum allowed power follows the class of the user equipment. $P_{SRS\_OFFSET}$ corresponds to a 4-bit UE-specific parameter, which is semi-statically determined by a higher layer. $M_{SRS}$ corresponds to a bandwidth of an SRS transmission of subframe i and may be expressed as a number of blocks. f(i) indicates a current power control adjustment state for the PUSCH. $P_{O\_PUCCH}(j)$ corresponds to a parameter configured of a sum of $P_{O\_NOMINAL\_PUCCH}(j)$ and $P_{O\_NOMINAL\_SPECIFIC}(j)$. Herein, $P_{O\_NOMINAL\_PUSCH}(j)$ is cell-specifically provided by a higher layer, and $P_{O\_UE\_SPECIFIC}(j)$ is UE-specifically provided by a higher layer. Herein, j is given a value of 1 for a PUSCH (re-)transmission corresponding to a dynamically scheduled grant. Also, $\alpha \cdot PL$ is used for path-loss compensation, wherein PL represents downlink path-loss estimated by the user equipment, and wherein α is given a scaling value equal to or less than 1, which is expressed as a 3-bit value. When α is equal to 1, the path-loss is completely compensated. And, when α is less than 1, the path-loss is partially compensated. When j is equal to 1, $\alpha \in \{0, 0.4, 0.5, 0.6, 0.7, 0.8, 0.9, 1\}$ corresponds to a 3-bit cell specific parameter being provided by a higher layer. As a downlink path loss measurement value, PL is estimated by the UE, and its unit corresponds to dB.

Referring to FIG. 8, the UE that is equipped with a single antenna port may perform SRS transmission in subframe i at $P_{SRS}(i)$, which is decided as described above, through the single antenna port.

Unlike the LTE system, which is equipped with only one transmission antenna, in the LTE-A system, an uplink transmitter may be equipped with more than one antenna port, for example, 2 antenna ports or 4 antenna ports, for a greater throughput performance.

Figure 9:
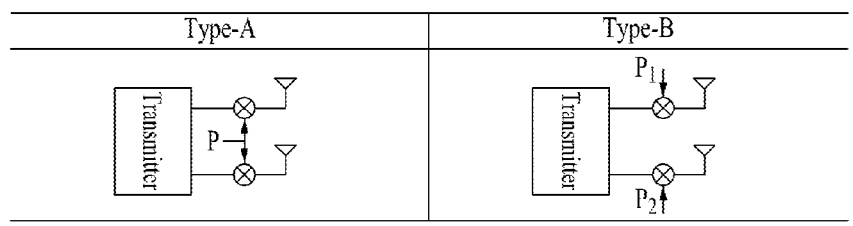
FIG. 9 and FIG. 10 illustrate a general structure of an uplink transmitter, which is equipped with multiple antenna ports.
Figure 10:
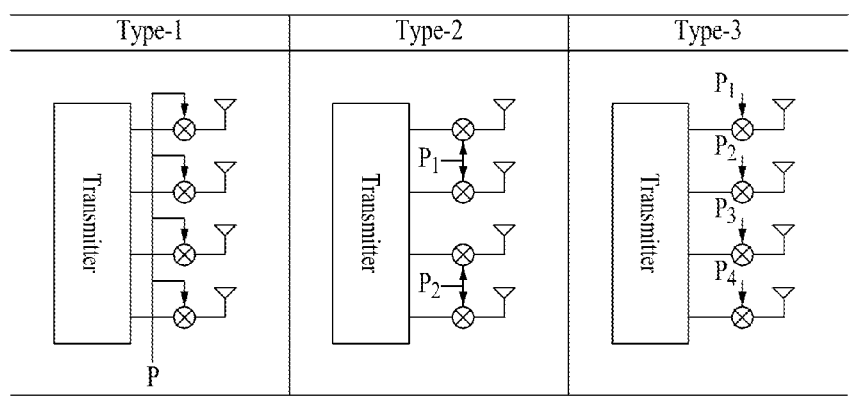

FIG. 9 and FIG. 10 illustrate a general structure of an uplink transmitter, which is equipped with multiple antenna ports. Most particularly, FIG. 9 shows an exemplary uplink transmitter being provided with 2 antenna ports, and FIG. 10 shows an exemplary uplink transmitter being provided with 4 antenna ports.

In case multiple antenna ports are being used for the transmission of uplink physical channels, the transmission power for the uplink physical channel is distributed to the multiple antenna ports. For example, referring to Type-A of FIG. 9, $P_{PUSCH/PUCCH/SRS}$ may be distributed to 2 antenna ports uniformly, which are connected to the uplink transmitter. And, referring to Type-1 of FIG. 10, $P_{PUSCH/PUCCH/SRS}$ may be distributed to 4 antenna ports uniformly, which are connected to the uplink transmitter. Referring to Type-B of FIG. 9, $P_{PUSCH/PUCCH/SRS}$ may be distributed to 2 antenna ports so that $P_{PUSCH/PUCCH/SRS}=P_1+P_2$ uniformly. Referring to Type-3 of FIG. 10, $P_{PUSCH/PUCCH/SRS}$ may be distributed to 4 antenna ports so that $P_{PUSCH/PUCCH/SRS}=P_1+P_2+P_3+P_4$. And, referring to Type-2 of FIG. 10, $P_{PUSCH/PUCCH/SRS}$ may be distributed to 4 antenna ports so that $P_{PUSCH/PUCCH/SRS}=P_1/2+P_1/2+P_2/2+P_2/2$.

It has been illustrated in FIG. 8 to FIG. 10 that one antenna port is connected for each power amplifier. However, this is merely exemplary and, therefore, it may also be possible to have one power amplifier be connected to multiple antenna ports. Most particularly, when multiple antenna ports are required to perform uplink transmission at the same transmission power level, by having one power amplifier be connected to the multiple antenna ports, an uplink signal that is being transmitted through multiple antenna ports may be amplified. For example, referring to Type-1 of FIG. 10, since the 4 antenna ports have the same power level of P, the Type-1 uplink transmitter of FIG. 10 may be configured to include 1 power amplifier, which is connected to 4 antenna ports. In another example, referring to Type-2 of FIG. 10, among the 4 antenna ports, since 2 antenna ports have the same power level of $P_1$, and since the remaining 2 antenna ports have the same power level of $P_2$, the Type-2 uplink transmitter of FIG. 10 may be configured to be equipped with 2 power amplifiers, each being connected to 2 antenna ports.

Meanwhile, referring to FIG. 3, an uplink transmitter (100a) may be equipped with a precoder (304). When precoding is used for the uplink transmission, a codebook should be considered in an uplink power control mechanism. Table 8 shows an example of a codebook for 2 antenna ports in an uplink transmission.

TABLE 8

| Codebook index | Number of layers | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | |
| 2 | $\frac{1}{\sqrt{2}}\begin{bmatrix}1\\j\end{bmatrix}$ | |
| 3 | $\frac{1}{\sqrt{2}}\begin{bmatrix}1\\-j\end{bmatrix}$ | — |
| 4 | $\frac{1}{\sqrt{2}}\begin{bmatrix}1\\0\end{bmatrix}$ | |
| 5 | $\frac{1}{\sqrt{2}}\begin{bmatrix}0\\1\end{bmatrix}$ | |

Referring to Table 8, 6 precoding vectors may be used for a single layer transmission, i.e., Rank-1 transmission, and 1 precoding matrix may be used for 2 layer transmissions, i.e., Rank-2 transmission.

Table 9 and Table 10 respectively show exemplary codebooks for 4 antenna ports. Herein, Table 9 corresponds to a codebook that can be used in a Rank-1 transmission, and Table 10 corresponds to a codebook that can be used in a Rank-2 transmission.

TABLE 9

Codebook for 4Tx rank-1

| Index 0 to 7 | $\frac{1}{2}\begin{bmatrix}1\\1\\1\\-1\end{bmatrix}$ | $\frac{1}{2}\begin{bmatrix}1\\1\\j\\j\end{bmatrix}$ | $\frac{1}{2}\begin{bmatrix}1\\1\\-1\\1\end{bmatrix}$ | $\frac{1}{2}\begin{bmatrix}1\\1\\-j\\-j\end{bmatrix}$ | $\frac{1}{2}\begin{bmatrix}1\\j\\1\\j\end{bmatrix}$ | $\frac{1}{2}\begin{bmatrix}1\\j\\j\\1\end{bmatrix}$ | $\frac{1}{2}\begin{bmatrix}1\\j\\-1\\-j\end{bmatrix}$ | $\frac{1}{2}\begin{bmatrix}1\\j\\-j\\-1\end{bmatrix}$ |
| --- | --- | --- | --- | --- | --- | --- | --- | --- |
| Index 8 to 15 | $\frac{1}{2}\begin{bmatrix}1\\-1\\1\\1\end{bmatrix}$ | $\frac{1}{2}\begin{bmatrix}1\\-1\\j\\-j\end{bmatrix}$ | $\frac{1}{2}\begin{bmatrix}1\\-1\\-1\\-1\end{bmatrix}$ | $\frac{1}{2}\begin{bmatrix}1\\-1\\-j\\j\end{bmatrix}$ | $\frac{1}{2}\begin{bmatrix}1\\-j\\1\\-j\end{bmatrix}$ | $\frac{1}{2}\begin{bmatrix}1\\-j\\j\\-1\end{bmatrix}$ | $\frac{1}{2}\begin{bmatrix}1\\-j\\-1\\j\end{bmatrix}$ | $\frac{1}{2}\begin{bmatrix}1\\-j\\-j\\1\end{bmatrix}$ |

TABLE 9-continued

Codebook for 4Tx rank-1

| Index 16 to 23 | $\frac{1}{2}\begin{bmatrix}1\\0\\1\\0\end{bmatrix}$ | $\frac{1}{2}\begin{bmatrix}1\\0\\-1\\0\end{bmatrix}$ | $\frac{1}{2}\begin{bmatrix}1\\0\\j\\0\end{bmatrix}$ | $\frac{1}{2}\begin{bmatrix}1\\0\\-j\\0\end{bmatrix}$ | $\frac{1}{2}\begin{bmatrix}0\\1\\0\\1\end{bmatrix}$ | $\frac{1}{2}\begin{bmatrix}0\\1\\0\\-1\end{bmatrix}$ | $\frac{1}{2}\begin{bmatrix}0\\1\\0\\j\end{bmatrix}$ | $\frac{1}{2}\begin{bmatrix}0\\1\\0\\-j\end{bmatrix}$ |

TABLE 10

Codebook for 4Tx rank-2

| Index 0 to 7 | $\frac{1}{2}\begin{bmatrix}1&0\\1&0\\0&1\\0&-j\end{bmatrix}$ | $\frac{1}{2}\begin{bmatrix}1&0\\1&0\\0&1\\0&j\end{bmatrix}$ | $\frac{1}{2}\begin{bmatrix}1&0\\-j&0\\0&1\\0&1\end{bmatrix}$ | $\frac{1}{2}\begin{bmatrix}1&0\\-j&0\\0&1\\0&-1\end{bmatrix}$ | $\frac{1}{2}\begin{bmatrix}1&0\\-1&0\\0&1\\0&-j\end{bmatrix}$ | $\frac{1}{2}\begin{bmatrix}1&0\\-1&0\\0&1\\0&j\end{bmatrix}$ | $\frac{1}{2}\begin{bmatrix}1&0\\j&0\\0&1\\0&1\end{bmatrix}$ | $\frac{1}{2}\begin{bmatrix}1&0\\j&0\\0&1\\0&-1\end{bmatrix}$ |
| Index 8 to 15 | $\frac{1}{2}\begin{bmatrix}1&0\\0&1\\1&0\\0&1\end{bmatrix}$ | $\frac{1}{2}\begin{bmatrix}1&0\\0&1\\1&0\\0&-1\end{bmatrix}$ | $\frac{1}{2}\begin{bmatrix}1&0\\0&1\\-1&0\\0&1\end{bmatrix}$ | $\frac{1}{2}\begin{bmatrix}1&0\\0&1\\-1&0\\0&-1\end{bmatrix}$ | $\frac{1}{2}\begin{bmatrix}1&0\\0&1\\0&1\\1&0\end{bmatrix}$ | $\frac{1}{2}\begin{bmatrix}1&0\\0&1\\0&-1\\1&0\end{bmatrix}$ | $\frac{1}{2}\begin{bmatrix}1&0\\0&1\\0&1\\-1&0\end{bmatrix}$ | $\frac{1}{2}\begin{bmatrix}1&0\\0&1\\0&-1\\-1&0\end{bmatrix}$ |

A precoding vector/matrix may be used for turning off some of the antenna ports among the multiple antenna ports. For example, based upon an uplink signal received from each antenna port of the UE, the BS may notify the UE of information on the precoding matrix that is to be used by the UE during the uplink transmission. At this point, the BS may also notify the UE of information corresponding to a precoding matrix that prevent the UE from using a particular antenna port, which has been determined to have a low uplink transmission quality, as compared to other antenna ports equipped to the corresponding UE. For example, referring to Table 8, codebook index 4 or codebook index 5 respective to the Rank-1 transmission may be used for turning off 1 antenna port among the 2 antenna ports. Referring to Table 9, by transmitting codebook indexes 16 to 23, the BS may turn off 2 antenna ports among the 4 antenna ports.

As described above, when some of the antenna ports, among the antenna ports that are configured for the transmission of the uplink physical channel, are turned off, and when only a few antenna ports, among the total antenna ports, are used for the uplink transmission, the power consumption in the UE may be reduced. This is because each precoding matrix has a power scaling factor. For example, each precoding matrix of Table 8 has a power scaling factor of $1/\sqrt{2}$. And, accordingly, after passing through the precoder (304), the transmission power of a transmission signal for each antenna port is scaled to ½ the size of the transmission power for the overall antenna ports. Additionally, each precoding matrix of Table 9 and Table 10 has a power scaling factor of ½. And, accordingly, after passing through the precoder (304), the transmission power of a transmission signal for each antenna port is scaled to ¼ the size of the transmission power for the overall antenna ports.

In the related art, due to the UE structure having a single power amplifier, wherein a single power control factor is used as a closed-loop correction factor, the related art uplink power control has been used regardless of the number of antenna ports. For example, referring to Equation 1 to Equation 9, regardless of the number of antenna ports that are actually used for the PUSCH/PUCCH/SRS transmission, the $\delta_{PUSCH/PUCCH}$ is used based upon the decision of $P_{PUSCH/PUCCH/SRS}$.

For example, referring to Table 2, when the BS sets up a TPS command field to 0, and when the BS transmits a PDCCH of DCI format 0 or 3 to the UE, if the UE enables the accumulation due to the higher layer, the UE may calculate f(i) by setting up $\delta_{PUSCH}$ to −1 in Equation 3. In case the accumulation is disabled, the UE may set up f(i−1)=0 of Equation 3 and may set the $\delta_{PUSCH}$ to −4, so as to calculate f(i). As described above, $P_{PUSCH/PUCCH/SRS}$ is decided based upon Equation 1 and Equation 9, and when $P_{PUSCH/PUCCH/SRS}$ is corrected by a single power control factor, and when number of antenna ports that are actually used for the transmission of the corresponding uplink signal is reduced to be less than the number of antenna ports that are configured for the transmission of the corresponding uplink signal, the power consumption of the UE is reduced. For example, in case of an uplink transmission using the codebook index 4 or codebook index 5, the transmission power used by the UE for the corresponding uplink transmission is reduced to ½, and in case of an uplink transmission using any one of codebook index 16 to codebook index 23, the transmission power used by the UE for the corresponding uplink transmission is reduced to ½. However, when the UE transmits an uplink signal at a low transmission power, a reception intensity of the uplink signal may become weaker. Therefore, with the exception for a special case, when an antenna port is turned off due to a lack of battery capacity in the UE, the off state of the antenna port may refer to an inefficient usage of the UE transmission power. For example, when some of the antenna ports are turned off due to a power imbalance in each antenna port caused by a specific handset situation, such as hand gripping, power correction using a single power control factor may deteriorate the power usage of the UE.

Therefore, in order to more effectively support the uplink power control, the exemplary embodiments of the present invention may adjust granularity of the power control, based upon specific situations, such as a transmission scheme, a transmission rank, a precoder element, and so on. For this, the present invention may employ multiple TPC command types.

Multiple TPC Command Type

In the related art wireless communication system, as it can be known from Table 2 and Table 3 and from Table 6 and Table 7, depending upon a DCI format of the PDCCH carrying the TPC command and the type of uplink physical channel, the TPC command and a mapping relation of a power correction factor δ respective to the uplink physical channel are defined. However, regardless of the number of antenna ports that are actually used for the uplink transmission, when a specific TPC command is mapped by using a single δ value, the transmission power of the UE may not be efficiently used. Therefore, in defining a mapping relation between a TPC command and a power correction factor δ, the present invention, in addition to the DCI format of the PDCCH, which carries the TPC command, and the uplink physical channel types, an uplink transmission situation is also taken into consideration. For example, a number of antenna ports actually being used for the uplink transmission, a transmission rank, a precoder element, and so on, may be considered when defining the mapping relation between the TPC command and the power correction factor δ. Accordingly, in addition to Table 2 and Table 3 and in addition to Table 6 and Table 7, or as replacement for Table 2 and Table 3 and for Table 6 and Table 7, other mapping table(s) may be defined so that the TPC command can be mapped to a different δ value depending upon the circumstances. The UE and the BS according to the present invention are aware of the mapping table(s) that is/are differently defined for each circumstance. Herein, the mapping (Table)s may be stored in the memory (200a, 200b) of the UE and the BS.

Hereinafter, when a mapping relation between a TPC command and a δ value, in a circumstance when the number of antenna ports being used for the actual uplink transmission is smaller than the number of antenna ports configured in the UE, is defined in addition to the mapping relations defined in Table 2, Table 3, Table 6, and Table 7, the respective embodiments of the present invention will be described in detail. However, as described above, new mapping relation(s) that can replace the conventional (or already-existing) mapping relations may also be defined.

Table 11 and Table 12 show exemplary mapping relations between the TPC command and the δ value, which can be used in a situation other than the conventional (or already-existing) situations. Most particularly, Table 11 shows an exemplary mapping relation between a TPC command of DCI format 0/3 and $\delta_{PUSCH}$, which can be applied to another situation, and Table 12 shows an exemplary mapping relation between a TPC command of DCI format 3A and $\delta_{PUSCH}$, which can be applied to another situation.

TABLE 11

| TPC Command Field in DCI format 0/3 | Accumulated $\delta_{PUSCH}$ [dB] | Absolute $\delta_{PUSCH}$ [dB] only DCI format 0 |
| --- | --- | --- |
| 0 | −1 | −8 |
| 1 | 0 | −2 |
| 2 | 3 | 2 |
| 3 | 6 | 8 |

TABLE 12

| TPC Command Field in DCI format 3A | Accumulated $\delta_{PUSCH}$ [dB] |
| --- | --- |
| 0 | −1 |
| 1 | 3 |

The $\delta_{PUSCH}$ value being mapped to a bit value, which is set up (or determined) in the TPC command field of Table 11 and Table 12, is merely exemplary. And, therefore, a $\delta_{PUSCH}$ value having a different size with respect to a specific TPC command bit may be defined. Additionally, in the description of the present invention, although only Table 11 and Table 12 are given as the examples of the mapping table(s) that is/are used for deciding the $P_{PUSCH}$, which corresponds to the transmission power of the PUSCH, a mapping table that is used for deciding the $P_{PUCCH}$, which corresponds to the transmission power of the PUCCH, may be defined in addition to Table 6 and Table 7, or may be defined in order to replace Table 6 and Table 7.

As described above, in order to allow the uplink power to be optimized in accordance with an uplink transmission situation, diverse types of TPC command mapping tables may be defined for one transmission mode.

According to the present invention, even if the DCI format and uplink physical channel type are identical, depending upon circumstances, different mapping tables may be used for the same TPC command. Hereinafter, a mapping table between a conventional TPC command and a power correction factor will be referred to as a TPC Type-1 mapping table, and a mapping table that is newly defined based upon the uplink transmission situation will be referred to as a TPC Type-2 mapping table. And, the respective exemplary embodiments of the present invention will hereinafter be described in detail.

Number of Antenna Ports Specific TPC Command

Depending upon the number of antenna ports that are actually used by the UE for the transmission, the same TPC command may be mapped to a different δ value. Based upon the total number of antenna ports that can be configured by the UE for an uplink transmission and the number of antenna ports that are actually used by the UE for the uplink transmission, the BS may decide the power correction factor δ. For example, if the number of antenna ports that are actually used by the UE for the uplink transmission is smaller than the number of antenna ports that can be configured by the UE for the uplink transmission, the BS may use the TPC Type-2 mapping table so that to transmit the TPC command to the UE.

When the UE accesses the network of the BS, or when the UE performs random access, the number of uplink antenna ports of the UE may be notified to the BS. The UE may transmit to the base station capability information, which indicates a number of transmission antenna ports, power levels, and so on, that can be supported by the UE, when the UE access the network of the BS, or when the UE performs random access, or when required by the BS. Meanwhile, the antenna ports that are actually used by the UE in order to perform uplink transmission to the BS may be signaled to the UE by the BS. Accordingly, the BS and the UE may be capable of knowing the number of antenna ports $N_t$, which can be configured by the UE for the transmission of the PUSCH or the PUCCH or the SRS. Additionally, the BS and the UE may also know the number of antenna ports that are actually used for the corresponding uplink physical channel transmission.

For example, referring to Table 2 and Table 11, the BS according to the present invention may decide the power correction factor $\delta_{PUSCH}$ of the UE, and the corresponding TPC command may be transmitted to the UE by using the PDCCH of DCI format 0/3. At this point, when all of the $N_t$ number of antenna ports, which may be configured by the UE for the PUSCH transmission, is used for the transmission of the PUSCH, the BS may determine a corresponding bit of the decided $\delta_{PUSCH}$ to the TPC command field in accordance with Table 2, so that the PDCCH can be transmitted to the UE. Conversely, among the $N_t$ number of antenna ports, when some of the antenna ports are turned off, the BS may determine a corresponding bit of the decided $\delta_{PUSCH}$ to the TPC command field in accordance with Table 11, so that the PDCCH can be transmitted to the UE. Since the UE is aware of the $N_t$ number of antenna ports, which may be configured by the UE for the PUSCH transmission, and the number of antenna ports that are actually used for the PUSCH transmission, depending upon the circumstances, the UE may decide the $\delta_{PUSCH}$ value by using the Table 2 or Table 11. When accumulation is enabled, the UE may substitute the accumulated $\delta_{PUSCH}$ value, which is indicated by the bit of the corresponding TPC command field, in Equation 3, so as to decide the $P_{PUSCH}$. And, when accumulation is disabled, an absolute $\delta_{PUSCH}$ value may be substituted in $f(i)=\delta_{PUSCH}(i-K_{PUSCH})$, so as to decide the $\delta_{PUSCH}$. The decided $P_{PUSCH}$ may be equally distributed to the antenna port(s), which is/are actually used for transmission. For example, when 4 antenna ports are used for an actual PUSCH transmission, a UE processor (400a) may control the UE transmitter (100a) so that the PUSCH can be transmitted as a transmission power of $P_{PUSCH}/4$.

Precoder Element Specific TPC Command

The BS refers to an uplink signal, which is transmitted from the UE, so as to estimate a channel status between the UE and the BS. And, based upon the estimated result, information on a precoding matrix that is to be used for the uplink transmission, e.g., a codebook index may be transmitted to the UE.

Meanwhile, in order to control an antenna gain imbalance cause by hand gripping, and so on, the UE may use codebook index 4 and codebook index 5 of Table 8 and may also use codebook index 16 to codebook index 23 of Table 9. Since precoding vectors/matrices corresponding to codebook index 4 and codebook index 5 of Table 8 and corresponding to codebook index 16 to codebook index 23 of Table 9 are used for turning some of the antenna ports off, the precoding vectors/matrices may also be referred to as antenna port turn off vectors/matrices. In light of an antenna port turn off, the uplink precoding matrix information that is transmitted by the BS to the UE may be used as information indicating the number of antenna ports, which are used by the UE in order to perform actual uplink transmission.

FIG. 11 and FIG. 12 illustrate examples for mapping a TPC command and power correction factors according to an exemplary embodiment of the present invention. Most particularly, FIG. 11 corresponds to a codebook for the UE, which can configure 2 transmission antenna ports, and FIG. 12 corresponds to a codebook for the UE, which can configure 4 transmission antenna ports.

For example, referring to FIG. 11, when the BS transmits any one of codebook index 1 to codebook index 3 to a UE, which can configure 2 transmission antennas, the UE may map the TPC command, which is transmitted by the BS, to the δ value in accordance with a Type-1 mapping table, thereby deciding the uplink transmission power. When the BS transmits codebook index 4 or codebook index 5 to the UE, the UE may map the TPC command, which is transmitted by the BS, to the δ value in accordance with a Type-2 mapping table, thereby deciding the uplink transmission power.

In another example, referring to FIG. 12, when the BS indicates (or directs) a Rank-1 transmission to the UE, which can configure 4 transmission antennas, and when the BS transmits any one of codebook index 9 to codebook index 15 to the UE, or when the BS indicates (or directs) a Rank-2 transmission to the UE, the UE may map the TPC command, which is transmitted by the BS, to the δ value in accordance with a Type-1 mapping table, thereby deciding the uplink transmission power. And, when the BS indicates (or directs) a Rank-1 transmission to the UE, and when the BS transmits any one of codebook index 16 to codebook index 23 to the UE, or when the BS indicates (or directs) a Rank-2 transmission to the UE, the UE may map the TPC command, which is transmitted by the BS, to the δ value in accordance with a Type-2 mapping table, thereby deciding the uplink transmission power.

Transmission Rank Specific TPC Command

Diverse exemplary embodiments using diverse TPC command mapping tables, in accordance with a number of uplink transmission antenna ports, or in accordance with whether or not an antenna port is in a turn off state. Also, instead of the number of antenna ports or the turn-off state, another TPC command mapping table may be used in accordance with the transmission rank. For example, the Type-1 mapping table may be defined to be used for a single layer transmission, i.e., Rank-1 transmission, and the Type-2 mapping table may be defined to be used for a multiple layer transmission, i.e., Rank-2 transmission or higher. More specifically, a Rank-specific TPC command mapping table may be defined and used.

TPC Type Configuration

In the above-described embodiments of the present invention, a type of the TPC command mapping table is implicitly decided in accordance with a number of antenna ports, an antenna port turn-off, a codebook index, and so on. Alternatively, the TPC command mapping type may also be explicitly defined, so that the BS can configure a type of the TPC command mapping table by using a semi-static method or a dynamic method. If the TPC command mapping type is semi-statically configured, an RRC (Radio Resource Control) configuration or a higher layer signaling should be supported. Otherwise, by including the TPC command type field in the DCI, the TPC command mapping type may be configured by using a dynamic method.

The semi-static or dynamic configuration of the TPC command type may be used along with an implicit configuration. For example, when some of the antenna ports are turned off due to a lack of battery capacity of the UE, the BS may semi-statically or dynamically perform signaling, so that the BS can use the conventional mapping table, i.e., Type-1 mapping table.

Figure 13:
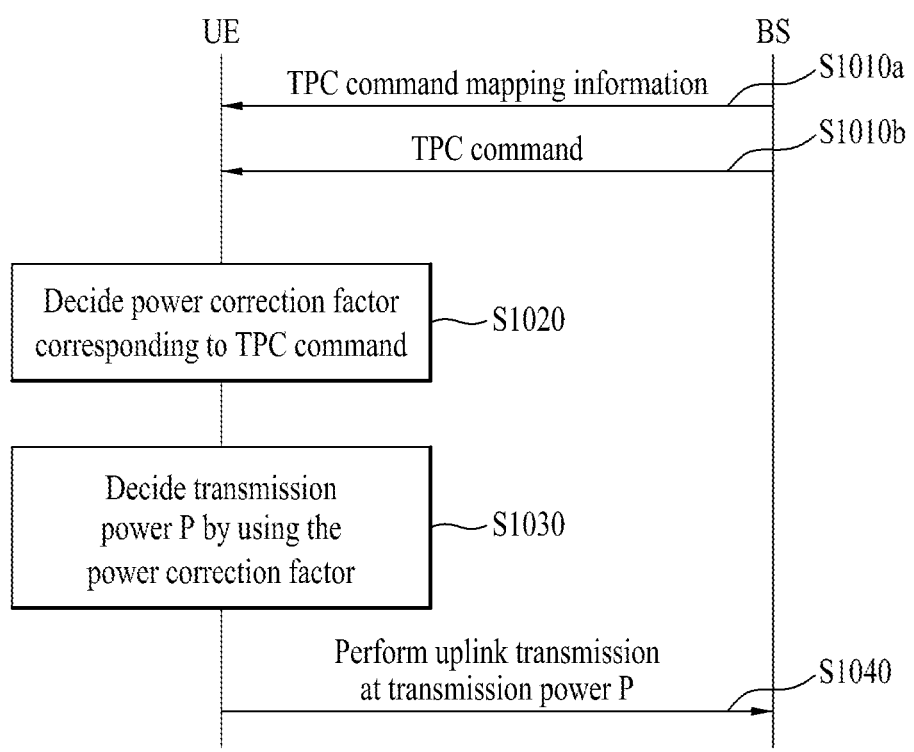
FIG. 13 illustrates a flow chart of an exemplary uplink power controlling method according to embodiments of the present invention.

FIG. 13 illustrates a flow chart of an exemplary uplink power controlling method according to embodiments of the present invention.

Referring to FIG. 13, the BS of the present invention may transmit TPC command type information indicating a TPC command mapping type to the UE (1010a). The TPC command type information may correspond to information indicating a number of antenna ports that are used for an actual uplink transmission, and may correspond to precoding matrix information (e.g., codebook index), and may correspond to rank information. Also, the TPC command type information may correspond to information that can be semi-statically configured and notified to the UE by the BS via RRC signaling or higher layer signaling. Furthermore, the TPC command type information may also correspond to information that is included in the DCI and that is dynamically signaled to the UE.

The BS transmits the TPC command indicating the power compensation factor δ, which is used for deciding a transmission power of the UE, to the UE (1010b). At this point, the BS may generate a specific TPC command corresponding to the power compensation factor δ in accordance with the TPC command mapping type that is to be used by the UE. For example, referring to FIG. 12, 11, when the BS transmits codebook index 4, the BS generates a TPC command corresponding to the power compensation factor δ in accordance with the Type-2 mapping table, and the BS may transmit a PDCCH carrying the TPC command to the UE.

The UE decides the power compensation factor δ, which is indicated by the TPC command received from the BS in accordance with the mapping table of the corresponding type, based upon the TPC command type information (1020). The UE uses the decided power compensation factor δ, so as to decide the transmission power P for the corresponding uplink transmission (S1030). For example, the UE substitutes the power compensation factor δ in Equation 3 and may decide the transmission power $P_{PUSCH}$ of the PUSCH in accordance with Equation 1. In another example, the UE substitutes the power compensation factor δ in Equation 8 and may decide the transmission power $P_{PUCCH}$ of the PUCCH in accordance with Equation 1.

The UE performs uplink transmission at the decided transmission power P (S1040). At this point, according to the present invention, the decided transmission power P may be equally distributed to the antenna port(s), which is/are actually used for the transmission. Each antenna port used in the uplink transmission performs uplink transmission at the distributed transmission power.

The BS receives the uplink transmission, and, based upon the intensity, quality, and so on, of the signals received by the uplink transmission, the BS may decide a new power compensation factor δ that is to control the uplink transmission power of the UE. The BS may generate a TPC command, which corresponds to the new power compensation factor δ, in accordance with the respective TPC command type, thereby transmitting the generated power compensation factor δ to the UE.

A BS Processor (400b), which is configured in accordance with a first exemplary embodiment of the present invention, may transmit TPC command type information, which indicates the TPC command mapping type, to the UE (1010a). The TPC command type information may correspond to information indicating a number of antenna ports that is used for the actual uplink transmission, or the TPC command type information may also correspond to precoding matrix information (e.g., codebook index) or to rank information. Alternatively, the TPC command type information may also correspond to information that is semi-statically configured by the BS and notified to the UE via RRC signaling or higher layer signaling. Furthermore, the TPC command type information may correspond to information included in the DCI and being dynamically signaled to the UE.

The BS processor (400b) generates a TPC command, which indicates the power compensation factor δ that is used for deciding the transmission power of the UE, and, in order to control the BS transmitter (100b), the BS processor (400b) transmits the TPC command to the UE (1010b).

The UE receiver (300a) receives the TPC command information and the TPC command and then delivers the received TPC command information and TPC command to the UE processor (400a). The UE processor (400a) decides the power compensation factor δ, which is indicated by the TPC command that is received from the BS in accordance with the mapping table of the corresponding type based upon the TPC command type information (1020). The UE processor (400a) uses the decided power compensation factor δ, so as to decide the transmission power for the corresponding uplink transmission (S1030).

The UE processor (400a) controls the UE transmitter (100a) so that uplink transmission can be performed at the decided transmission power P (S1040). The UE processor (400a) may control the UE transmitter (100a), so that the decided transmission power P can be equally distributed to the antenna port(s), which is/are actually used for the transmission. Based upon the control of the UE processor (400a), the UE transmitter (100a) performs uplink transmission at the distributed transmission power through each antenna port, which is used for the uplink transmission.

The BS receiver (100b) may receive the uplink transmission and may measure the intensity, quality, and so on, of the received signal caused by the uplink transmission, thereby delivering the measured intensity, quality, and so on to the BS processor (400b). The BS processor (400b) may decide a new power compensation factor δ that is to control the uplink transmission power of the UE. The BS processor (400b) may generate a TPC command corresponding to the new power compensation factor δ, in accordance with the corresponding TPC command type. Then, the BS processor (400b) may control the BS transmitter (100b), so as to transmit the generated TPC command to the UE.

Based upon an example in which the UE includes 2 transmission antenna ports, the flow of an uplink power control process according to the exemplary embodiment of the present invention may be described in more detail as shown below. Based upon an uplink signal, e.g., uplink reference signal, which is received from the UE, the BS processor (400b) may estimate a channel status between the UE and the BS, and, based upon the estimated channel status, the BS processor (400b) may generate a codebook index, as precoding matrix information, which correspond to a precoding matrix/vector that is to be used by the UE for uplink transmission. The BS processor (400b) may control the BS transmitter (100b), so that the precoding matrix information can be transmitted to the UE. Also, the BS processor (400b) may generate rank information indicating an uplink transmission rank based upon the estimated channel status, and the BS processor (400b) may control the BS transmitter (100b), so that the generated rank information can be transmitted to the UE.

The UE receiver (300a) receives the precoding matrix information and the rank information and, then, delivers the received information to the UE processor (400a). The UE processor (400a) may select the corresponding precoding matrix/vector based upon the precoding matrix information and the rank information, and the UE processor (400a) may control the UE transmitter (100a) so as to configure the precoder (304) in accordance with the selected precoding matrix/vector. The precoder (304) More specifically, the precoder (304) may map the transmission layers to the antenna ports. The precoder 304 may multiply an output x of the layer mapper (303) corresponding to $M_t$ number of layers by the selected $N_t \times M_t$ precoding matrix W, thereby outputting the resulting product in the form of an $N_t \times M_F$ matrix/vector z.

In deciding the transmission power of the uplink physical channel, the UE processor (400a) may use the new power compensation factor δ indicating the TPC command, which is received from the BS. For example, when any one of codebook index 0 to index 3 is received from the BS, the UE processor (400a) may decide the power compensation factor $\delta_{PUSCH}$ for the PUSCH from the TPC command in accordance with Table 2 (TPC command in DCI formats 0/3) or Table 3 (TPC command in DCI format 3A). The UE processor (400a) may decide the $P_{PUSCH}$ by using the $\delta_{PUSCH}$, and the UE processor (400a) may control the UE transmitter (100a) so that PUSCH transmission can be performed at a transmission power of $P_{PUSCH}/2$ from each of the two antenna ports.

Meanwhile, when codebook index 4 or 5 is received from the BS, the UE processor (400a) may decide the power compensation factor $\delta_{PUSCH}$ for the PUSCH from the TPC command in accordance with Table 11 (TPC command within DCI formats 0/3) or Table 12 (TPC command within DCI format 3A). The UE processor (400a) may decide the $P_{PUSCH}$ by using the $\delta_{PUSCH}$, and the UE processor (400a) may control the UE transmitter (100a), so that PUSCH transmission can be performed at the transmission power of the decided $P_{PUSCH}$, from an antenna port that is not turned off.

Since the grain size of the power correction value varies depending upon the numbers of antenna ports, which are actually used for the transmission, the uplink power in the exemplary embodiments of the present invention may be controlled with more efficiency.

Although the present invention has been described above, based upon examples corresponding to a case when an antenna port is not turned off, and a case when the antenna port is turned off, when the codebook is being defined, so that the number of antenna ports being turned off can be different from one another, the TPC mapping table may also be differently defined in accordance with the number of antenna ports that are actually used for the transmission or the number of antenna ports being turned off. For example, when a codebook for an 8-Tx transmission antenna port is defined, and when the codebook includes a precoding matrix/vector turning 2 antenna ports off and a precoding matrix/vector turning 4 antenna ports off, a TPC command mapping table for a case when 8 antenna ports are used for the uplink transmission, a TPC command mapping table for a case when 4 antenna ports are used, and a TPC command mapping table for a case when 2 antenna ports are used, are differently defined and may be applied and used for the uplink power control.

In addition to what is described above, for the description of the uplink transmission power, reference may be made to the standard document (e.g., 3GPP TS36.213), and detailed description of the same will be omitted for simplicity and clarity. However, it will be noted that the contents included in the standard document with respect to the uplink transmission power control may be applied to the uplink transmission power control.

For reference, in the LTE-A system, in order to use a broader frequency bandwidth, carrier aggregation or bandwidth aggregation, which uses a larger uplink/downlink bandwidth by grouping multiple uplink/downlink frequency blocks, may be applied. Each frequency block may also be referred to as a cell, a component carrier, or a band. And, each frequency block operates over a central frequency. For example, a UE supporting carrier aggregation in an uplink may perform uplink transmission by using multiple central frequencies. When the UE supports carrier aggregation, in Equation 1, Equation 4, and Equation 9, $P_{MAX}$ may correspond to a maximum transmission power for a specific frequency block, which is configured in the UE.

According to the conventional uplink power transmission method, even if an antenna port is turned off, the uplink transmission power is decided by using a power correction factor value, which is identical to that of a case when the antenna port is not turned off. Accordingly, the transmission power being allocated to the antenna port that is being turned off is not used for the uplink transmission, and only the transmission power allocated to the antenna port that is turned off is used for the uplink transmission. However, according to the present invention, since the UE decides an uplink transmission power by mapping the specific TPC command, which is received from the BS, to another power correction factor, in accordance with the TPC command type, an uplink transmission power having a different size may be decided in accordance with the TPC command type. According to the present invention, depending upon the uplink transmission circumstances, the same TPC command may be mapped to a power correction factor value of another level. Therefore, as compared to the case when the uplink power is controlled by a single power correction factor, the power control method according to the present invention is much more efficient.

As described above, the detailed description of the present invention are provided herein so that anyone skilled in the art can implement and realize the embodiments of the present invention. Although the preferred embodiments of the present invention have been disclosed and described herein, the present invention may be diversely varied and modified without deviating from the scope and spirit of the essential characteristics of the present invention. Therefore, in all aspect, the detailed description of present invention is not intended to limit the scope of the present invention to the exemplary embodiments presented herein. Instead, it will be intended to provide a broadest range best-fitting the principles and novel characteristics disclosed herein.

INDUSTRIAL APPLICABILITY

The exemplary embodiments of the present invention can be applied to a base station or a user equipment, and other communication devices in a wireless communication system.

What is claimed is:

1. A method for controlling uplink power at a user equipment being equipped with $N_t$ number of antenna ports (wherein $N_t>1$), the method comprising:
   receiving a transmission power control (TPC) command for controlling transmission power of an uplink signal from a base station; and
   deciding a transmission power of the uplink signal by using the TPC command;
   transmitting the uplink signal to the base station at the decided transmission power,
   wherein, when a number of antenna ports used for the transmission of the uplink signal is equal to N1 (wherein N1 is a positive integer equal to or less than $N_t$), the TPC command is mapped to a first correction value, so that the transmission power can be decided based upon the first correction value, and when the number of antenna ports used for the transmission of the uplink signal is equal to N2 (wherein N1≠N2, and wherein N2 is a positive integer equal to or less than $N_t$), the same TPC command is mapped to a second correction value, so that the transmission power can be decided based upon the second correction value different from the first correction value.

2. The method of claim 1, wherein the number of antenna ports used for the transmission of the uplink signal is decided based upon precoding matrix indication information, the precoding matrix indication information being received from the base station.

3. The method of claim 1, wherein the same TPC command is mapped to the first correction value according to a first mapping table when the number of antenna ports used for the transmission of the uplink signal is equal to N1, and the same TPC command is mapped to the second correction value according to a second mapping table different from the first mapping table when the number of antenna ports used for the transmission of the uplink signal is equal to N2.

4. A user equipment being equipped with $N_t$ number of antenna ports (wherein $N_t>1$), the user equipment comprises:
   a receiver configured to receive a transmission power control (TPC) command for controlling transmission power of an uplink signal from a base station; and a processor configured to decide a transmission power of the uplink signal by using the TPC command;

a transmitter configured to transmit the uplink signal to the base station at the decided transmission power, wherein, when a number of antenna ports used for the transmission of the uplink signal is equal to N1 (wherein N1 is a positive integer equal to or less than $N_t$), the processor maps the TPC command to a first correction value, so as to decide the transmission power based upon the first correction value, and when the number of antenna ports used for the transmission of the uplink signal is equal to N2 (wherein N1≠N2, and wherein N2 is a positive integer equal to or less than $N_t$), the processor maps the same TPC command to a second correction value, so as to decide the transmission power based upon the second correction value different from the first correction value.

5. The user equipment of claim 4, wherein the processor is configured to decide the number of antenna ports used for the transmission of the uplink signal based upon precoding matrix indication information, the precoding matrix indication information being received from the base station.

6. The user equipment of claim 4, wherein the processor is configured to map the same TPC command to the first correction value according to a first mapping table when the number of antenna ports used for the transmission of the uplink signal is equal to N1, and map the same TPC command to the second correction value according to a second mapping table different from the first mapping table when the number of antenna ports used for the transmission of the uplink signal is equal to N2.

* * * * *